US012378927B2

(12) United States Patent
Sukegawa et al.

(10) Patent No.: US 12,378,927 B2
(45) Date of Patent: Aug. 5, 2025

(54) IN-VEHICLE CONTROL DEVICE AND METHOD FOR CONTROLLING INTERNAL COMBUSTION ENGINE

(71) Applicant: Hitachi Astemo, Ltd., Hitachinaka (JP)

(72) Inventors: Yoshihiro Sukegawa, Tokyo (JP); Kengo Kumano, Tokyo (JP); Yoshihiko Akagi, Hitachinaka (JP); Kazuhiro Oryoji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/730,828

(22) PCT Filed: Feb. 20, 2023

(86) PCT No.: PCT/JP2023/005996
§ 371 (c)(1),
(2) Date: Jul. 22, 2024

(87) PCT Pub. No.: WO2023/223621
PCT Pub. Date: Nov. 23, 2023

(65) Prior Publication Data

US 2025/0101928 A1 Mar. 27, 2025

(30) Foreign Application Priority Data

May 18, 2022 (JP) ................................ 2022-081317

(51) Int. Cl.
*F01P 3/00* (2006.01)
*F01P 3/08* (2006.01)
*F01P 5/10* (2006.01)
*F01P 7/14* (2006.01)
*F02D 41/22* (2006.01)

(52) U.S. Cl.
CPC ................ *F02D 41/22* (2013.01); *F01P 3/08* (2013.01); *F01P 5/10* (2013.01); *F01P 7/14* (2013.01);
(Continued)

(58) Field of Classification Search
CPC ....... Y02T 10/12; Y02T 10/40; F02D 35/027; F02D 41/005; F02D 2200/0612;
(Continued)

(56) References Cited

U.S. PATENT DOCUMENTS 9,945,310 B1 * 4/2018 McQuillen ........... F02M 25/028
11,333,060 B2 5/2022 Kumano et al.
(Continued)

FOREIGN PATENT DOCUMENTS

CN 107642437 A * 1/2018 ............ B60W 10/06
CN 108204274 A * 6/2018 ............. F01N 13/10
(Continued)

OTHER PUBLICATIONS

International Search Report and Written Opinion with English translations of International Patent Application No. PCT/JP2023/005996 dated Apr. 4, 2023 (11 pages).

*Primary Examiner* — Lindsay M Low
*Assistant Examiner* — Teuta B Holbrook
(74) *Attorney, Agent, or Firm* — Foley & Lardner LLP

(57) ABSTRACT

This in-vehicle control device includes: a cooling period setting unit that sets a timing prior to the start timing of a predicted knock occurrence period as the increasing timing of a cooling amount of a combustion room, and sets a timing prior to an end timing of the predicted knock occurrence period as the decreasing timing of the cooling amount of the combustion room; and a cooling amount change unit that changes the cooling amount of the combustion room by a cooling mechanism on the basis of the set increasing and decreasing timings and a target cooling amount set by a target cooling amount setting unit.

13 Claims, 15 Drawing Sheets

(52) U.S. Cl.
CPC ... *F01P 2003/006* (2013.01); *F01P 2007/146* (2013.01); *F01P 2031/00* (2013.01)

(58) Field of Classification Search
CPC ........ F02D 41/22; F02D 35/023; F02D 41/02; F02D 41/14; F02D 41/1401; F02D 2200/021; F02D 2200/022; F02P 5/152; F02P 5/15; F02P 5/10; F02P 2017/128; F02P 17/02; F02B 77/085; F01P 2025/00; F01P 2025/31; F01P 2003/006; F01P 2003/008; F01P 2023/00; F01P 2023/08; F01P 7/14
USPC ............................... 701/101, 102; 123/41.35
See application file for complete search history.

(56) References Cited

U.S. PATENT DOCUMENTS

| | | | | |
|---|---|---|---|---|
| 2008/0087255 | A1* | 4/2008 | Aoyama | F02D 13/0269 123/48 B |
| 2018/0252197 | A1* | 9/2018 | Glugla | F02P 5/1527 |
| 2020/0269829 | A1 | 8/2020 | Brockley | |
| 2022/0009479 | A1* | 1/2022 | Sukegawa | B60W 20/20 |
| 2022/0106902 | A1 | 4/2022 | Kumano et al. | |

FOREIGN PATENT DOCUMENTS

| | | | | | |
|---|---|---|---|---|---|
| CN | 106481429 | B | * | 5/2019 | |
| CN | 111878214 | A | * | 11/2020 | F01P 3/08 |
| DE | 102019118916 | A1 | * | 1/2020 | F02D 11/105 |
| GB | 2 552 501 | A | | 1/2018 | |
| JP | 2003239747 | A | * | 8/2003 | |
| JP | 2004204740 | A | * | 7/2004 | |
| JP | 3579933 | B2 | * | 10/2004 | |
| JP | 2008106653 | A | * | 5/2008 | |
| JP | 4168638 | B2 | * | 10/2008 | |
| JP | 2009085161 | A | * | 4/2009 | F02P 5/1521 |
| JP | 4591435 | B2 | * | 12/2010 | |
| JP | 2017040209 | A | * | 2/2017 | |
| JP | 2018197514 | A | * | 12/2018 | |
| JP | 2019120225 | A | * | 7/2019 | |
| JP | 2020148170 | A | * | 9/2020 | B60K 11/02 |
| WO | WO-2019176270 | A1 | * | 9/2019 | |

* cited by examiner

IN-VEHICLE CONTROL DEVICE AND METHOD FOR CONTROLLING INTERNAL COMBUSTION ENGINE

TECHNICAL FIELD

The present invention relates to an in-vehicle control device mounted in an automobile and a method for controlling an internal combustion engine.

BACKGROUND ART

In order to comply with automobile fuel efficiency regulations, which are becoming stricter year by year, technologies that promote downsizing, supercharging, and higher compression ratios for internal combustion engines are being adopted. The adoption of these technologies increases the load factor of an internal combustion engine and the pressure and temperature in a combustion chamber. Therefore, the occurrence of knocking has become an issue when complying with the automobile fuel efficiency regulations.

Cooling the internal combustion engine is an effective way to suppress knocking. Meanwhile, cooling the internal combustion engine may cause increases in cooling loss and friction loss. For this reason, when suppressing knocking by cooling the internal combustion engine, it is necessary to optimize the amount of cooling and the timing of cooling for the driving conditions of automobiles.

Therefore, Patent Literature 1 discloses a technology for controlling the temperature and cooling timing of a coolant for the internal combustion engine on the basis of the predicted results of future engine output (output of the internal combustion engine). More specifically, Patent Literature 1 discloses a control device including a target coolant temperature determination unit that determines a target temperature of the coolant on the basis of the predicted output of the internal combustion engine and a change timing setting unit that sets a change timing for changing the temperature of the coolant to the target temperature on the basis of the predicted output of the internal combustion engine, in which the change timing setting unit sets the timing at which the predicted output of the internal combustion engine switches from low output to high output, or at which the predicted output of the internal combustion engine switches from high output to low output, as the above change timing.

CITATION LIST

Patent Literature

Patent Literature 1: Japanese Unexamined Patent Application Publication No. 2020-148170

SUMMARY OF INVENTION

Technical Problem

When an internal combustion engine is cooled, a temperature response delay associated with the heat capacity of the internal combustion engine occurs. This temperature response delay is the time delay from the start of the cooling operation of the internal combustion engine by a cooling mechanism until the temperature of the internal combustion engine actually drops to a target temperature. Therefore, in a case where the output of the internal combustion engine changes significantly over time, such as when accelerating an automobile, that is, under transient driving conditions, if the cooling timing is not set in consideration of the time of temperature response delay, the knocking suppression effect by cooling may not be sufficient or the cooling loss and friction loss may increase, which may result in a deterioration in the fuel efficiency of the internal combustion engine.

However, the technology disclosed in Patent Literature 1 does not take into account the temperature response delay associated with heat capacity in cooling the internal combustion engine, and therefore there is a risk that the fuel efficiency of the internal combustion engine will deteriorate.

The present invention has been made in view of the above circumstances, and an object of the present invention is to provide an in-vehicle control device and a method for controlling an internal combustion engine, whereby it is possible to reduce cooling loss and friction loss while effectively suppressing knocking.

Solution to Problem

In order to address the above problems, an in-vehicle control device according to one aspect of the present invention is mounted in an automobile that is driven by an internal combustion engine having a combustion chamber, and includes: a cooling mechanism that cools the combustion chamber; an engine output prediction unit that predicts an engine output that is a future output of the internal combustion engine; a knock intensity prediction unit that predicts a future knock intensity on the basis of the engine output predicted by the engine output prediction unit; a knock occurrence period prediction unit that predicts a future knock occurrence period on the basis of the knock intensity predicted by the knock intensity prediction unit; a target cooling amount setting unit that sets a target amount of cooling delivered by the cooling mechanism on the basis of the knock intensity predicted by the knock intensity prediction unit; a cooling timing setting unit that sets, as an increase timing of an amount of cooling of the combustion chamber, a timing that precedes a start timing of the knock occurrence period predicted by the knock occurrence period prediction unit by a predetermined amount of time, and sets, as a decrease timing of the amount of cooling of the combustion chamber, a timing that precedes an end timing of the knock occurrence period predicted by the knock occurrence period prediction unit by a predetermined amount of time; and a cooling amount change unit that changes the amount of cooling of the combustion chamber by the cooling mechanism, on the basis of the increase timing and decrease timing set by the cooling timing setting unit and the target amount of cooling set by the target cooling amount setting unit.

In addition, a method for controlling an internal combustion engine according to one aspect of the present invention is a method for controlling an internal combustion engine in an automobile, the automobile including the internal combustion engine having a combustion chamber, and a cooling mechanism for cooling the combustion chamber. The method includes: an engine output prediction step for predicting an engine output that is a future output of the internal combustion engine; a knock intensity prediction step for predicting a future knock intensity on the basis of the engine output predicted in the engine output prediction step; a knock occurrence period prediction step for predicting a future knock occurrence period on the basis of the knock intensity predicted in the knock intensity prediction step; a target cooling amount setting step for setting a target amount of cooling delivered by the cooling mechanism on the basis of the knock intensity predicted in the knock intensity prediction step; a cooling timing setting step for setting, as an increase timing of an amount of cooling of the combustion chamber, a timing that precedes a start timing of the knock occurrence period predicted in the knock occurrence period prediction step by a predetermined amount of time, and sets, as a decrease timing of the amount of cooling of the combustion chamber, a timing that precedes an end timing of the knock occurrence period predicted in the knock occurrence period prediction step by a predetermined amount of time; and a cooling amount change step for changing the amount of cooling of the combustion chamber by the cooling mechanism, on the basis of the increase timing and decrease timing set in the cooling timing setting step and the target amount of cooling set in the target cooling amount setting step.

Advantageous Effects of Invention

According to at least one aspect of the present invention, it is possible to reduce cooling loss and friction loss while effectively suppressing knocking.

DESCRIPTION OF EMBODIMENTS

Hereinafter, exemplary embodiments of the present invention will be described with reference to the accompanying drawings. In this specification and the accompanying drawings, components having substantially the same functions or configurations are denoted by the same reference signs, and the duplicate description thereof will be omitted.

First Embodiment

Figure 1:
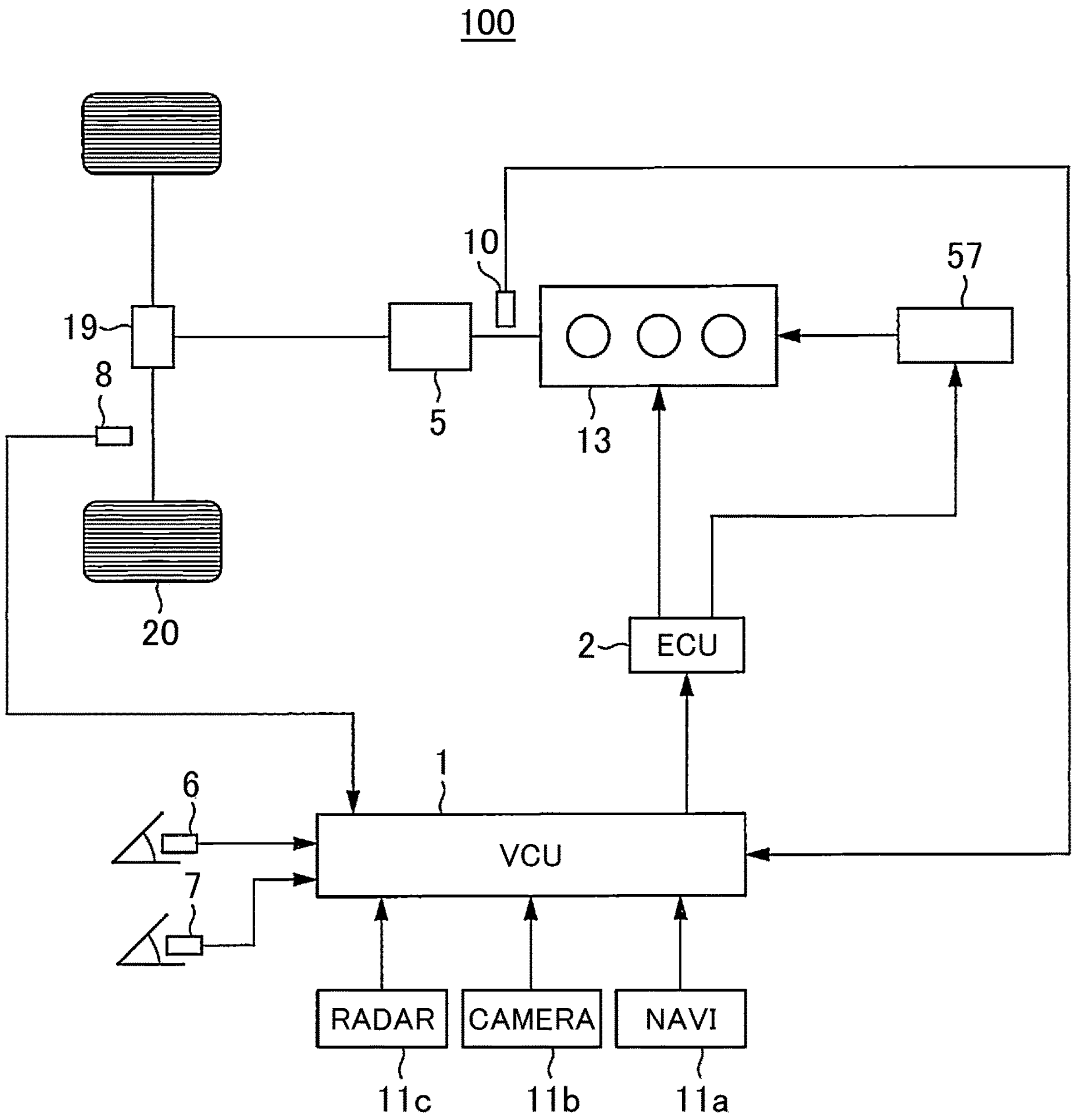
FIG. 1 is a schematic configuration diagram illustrating an example of an automobile in which an in-vehicle control device according to a first embodiment is mounted.

FIG. 1 is a schematic configuration diagram illustrating an example of an automobile in which an in-vehicle control device according to a first embodiment is mounted.

As illustrated in FIG. 1, an automobile 100 includes a vehicle control unit (VCU) 1, an engine control unit (ECU) 2, a transmission 5, an accelerator position sensor 6, a brake switch 7, an automobile speed sensor 8, a crank angle sensor 10, a navigation device 11*a*, a vehicle-mounted camera 11*b*, a vehicle-mounted radar 11*c*, an internal combustion engine 13, a differential gear 19, and a variable displacement oil pump 57.

The VCU 1 is an automobile control device that controls the automobile 100. The ECU 2 is an internal combustion engine control device that controls the internal combustion engine 13. The transmission 5 is a mechanism for switching gear ratios in accordance with the rotational speed of the internal combustion engine 13. The accelerator position sensor 6 is a sensor for detecting the amount of depression of an accelerator pedal, that is, the accelerator position. The brake switch 7 is a sensor for detecting whether a brake pedal is depressed or not. The accelerator position sensor 6 and the brake switch 7 are provided in the cabin of the automobile 100. The automobile speed sensor 8 is a sensor for detecting the travel speed of the automobile 100. The automobile speed sensor 8 is provided to the drive shaft of wheels 20. The crank angle sensor 10 is a sensor for detecting the rotational angle of the crankshaft of the internal combustion engine 13. The crank angle sensor 10 is provided to the crankshaft of the internal combustion engine 13. The signals output from the automobile speed sensor 8 and the crank angle sensor 10 are input to the VCU 1. The signals output from the accelerator position sensor 6 and the brake switch 7 are also input to the VCU 1.

The navigation device 11*a* receives global positioning system (GPS) signals transmitted via satellite radio waves by a plurality of GPS satellites in the sky over the automobile 100, which is driven by the internal combustion engine 13, and thereby measures the current position of the automobile 100. The current position of the automobile 100 measured by the navigation device 11*a* can be overlaid and displayed on a map displayed on a display device in the automobile 100. For the measurement of the current position by the navigation device 11*a*, base stations for cell phone terminals, Wi-Fi (registered trademark) access points, and the like may also be used together. Information related to the current position of the automobile 100 as measured by the navigation device 11*a* and map information including the surroundings in which the automobile 100 is traveling and the route to the destination are input to the VCU 1.

The vehicle-mounted camera 11*b* captures vehicle images, road surface images, obstacle images, traffic sign images, and the like around the automobile 100. The vehicle-mounted radar 11*c* is, for example, a laser or millimeter wave radar, and measures the relative distances to stationary and moving objects around the automobile 100. The video signals captured by the vehicle-mounted camera 11*b* are input to the VCU 1. The measurement signals of the vehicle-mounted radar 11*c* are also input to the VCU 1.

The internal combustion engine 13 is, for example, a three-cylinder gasoline internal combustion engine for automobiles which uses spark ignition combustion, and is an example of an internal combustion engine. The crankshaft of the internal combustion engine 13 is provided with the crank angle sensor 10, and the other end of the crankshaft is connected to the transmission 5. The power of the internal combustion engine 13 is transmitted to the wheels 20 through the transmission 5 and the differential gear 19.

The VCU 1 calculates the demand torque of a driver on the basis of the output signal of the accelerator position sensor 6. That is, the accelerator position sensor 6 is used as a demand torque detection sensor that detects a demand torque for the internal combustion engine 13. The VCU 1 also determines whether or not the driver has requested deceleration on the basis of the output signal of the brake switch 7. In addition, the VCU 1 calculates the rotational speed of the internal combustion engine 13 on the basis of the output signal of the crank angle sensor 10. The VCU 1 then calculates an optimum operating amount for the internal combustion engine demand output on the basis of the driver demand acquired from the output signals of the above-mentioned sensors and the driving state of the automobile 100. The internal combustion engine demand output is the engine output (target output) required for the internal combustion engine by a manipulation by the driver. In addition, the manipulation by the driver is, for example, an accelerator manipulation or a brake manipulation, and the operating amount is, for example, the amount of operation of a fuel injection unit, an ignition unit, a throttle valve, a hydraulic pump, and the like.

The internal combustion engine demand output calculated by the VCU 1 is sent to the ECU 2. The ECU 2 controls the internal combustion engine 13 on the basis of the internal combustion engine demand output sent from the VCU 1. Specifically, the ECU 2 controls the variable displacement oil pump 57 in addition to the fuel injection unit, ignition unit, and throttle valve described above. The variable displacement oil pump 57 is provided as an example of a hydraulic pump that discharges engine oil (hereinafter simply referred to as "oil") at a predetermined pressure.

Next, the configuration of the internal combustion engine according to the first embodiment will be described with reference to FIG. 2.

Figure 2:
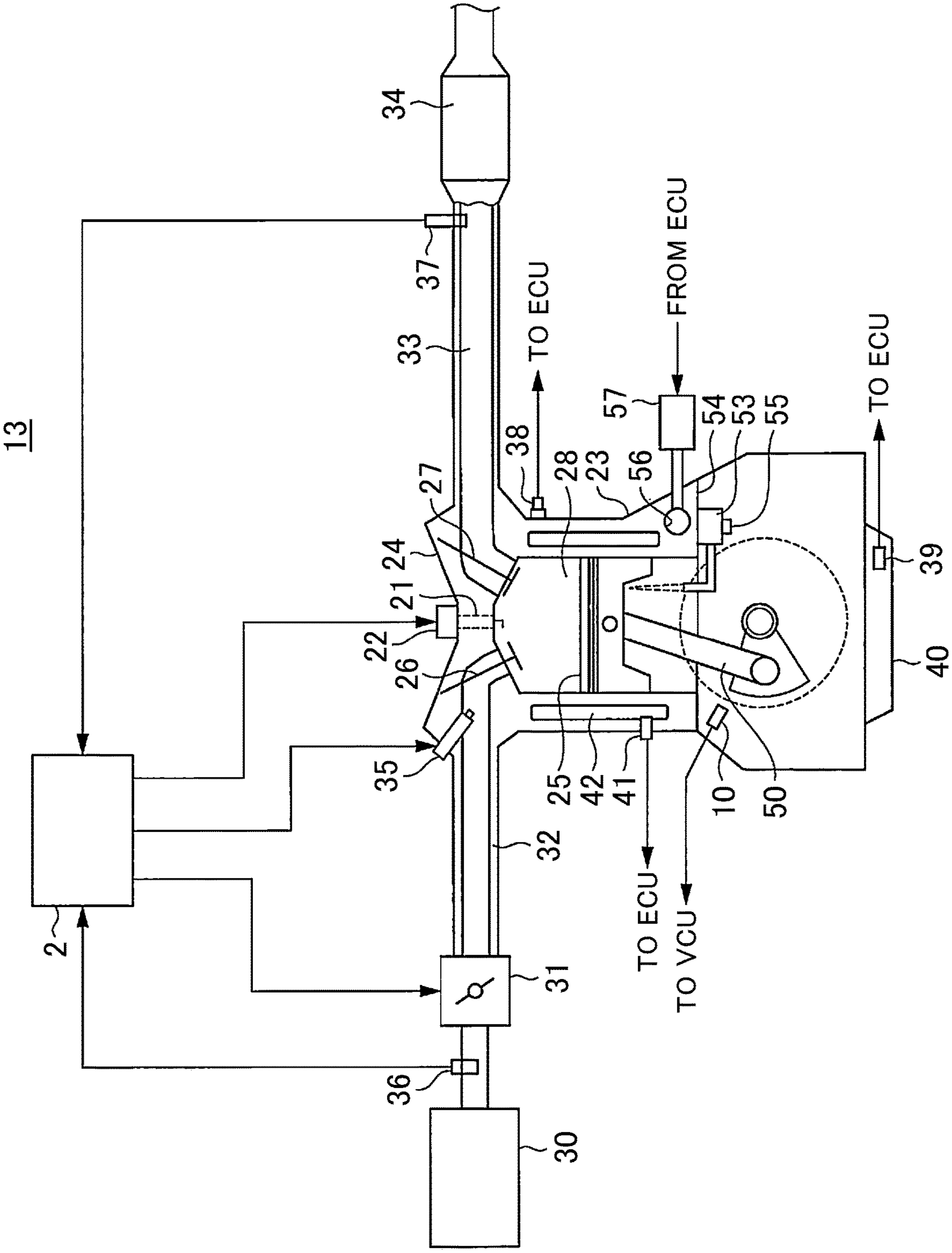
FIG. 2 is a schematic configuration diagram of an internal combustion engine according to the first embodiment.

FIG. 2 is a schematic configuration diagram of the internal combustion engine according to the first embodiment.

In FIG. 2, the internal combustion engine 13 is a spark ignition, four-stroke gasoline internal combustion engine. The internal combustion engine 13 includes a cylinder block 23, a cylinder head 24, a piston 25, an intake valve 26, and an exhaust valve 27, and these components form a combustion chamber 28.

An ignition plug 21 and an ignition coil 22 are installed in the cylinder head 24. Air for combustion is taken into the combustion chamber 28 through an air cleaner 30, a throttle valve 31, and an intake port 32. An air flow sensor 36 is disposed between the air cleaner 30 and the throttle valve 31. The air flow sensor 36 is a sensor for detecting the amount of air to be taken into the combustion chamber 28 from the air cleaner 30 through the throttle valve 31 and the intake port 32.

Meanwhile, the post-combustion gas discharged from the combustion chamber 28, that is, the exhaust gas, is discharged into the atmosphere through an exhaust port 33 and a catalytic converter 34. An air-fuel ratio sensor 37 is disposed upstream of the catalytic converter 34. The air-fuel ratio sensor 37 is a sensor for detecting the air-fuel ratio of the exhaust gas that is exhausted through the exhaust port 33. In addition, fuel is supplied into the intake port 32 by a fuel injection valve 35.

The amount of air to be taken into the combustion chamber 28 is detected by the ECU 2 reading the output of the air flow sensor 36. A temperature sensor and humidity sensor, which are not illustrated in the figure, are additionally installed in the air flow sensor 36. The ECU 2 detects the temperature and humidity of the air drawn in from the air cleaner 30 by reading the respective outputs of the temperature sensor and the humidity sensor.

Meanwhile, the air-fuel ratio of the gas (exhaust gas) discharged from the combustion chamber 28 is detected by the ECU 2 reading the output of the air-fuel ratio sensor 37. A knock sensor 38 is also provided to the cylinder block 23. The knock sensor 38 is a sensor for detecting knocking (hereinafter also referred to as "knock") in the combustion chamber 28 of the internal combustion engine 13. The ECU 2 detects the knock intensity in the combustion chamber 28 by reading the output of the knock sensor 38.

The degree of opening of the throttle valve 31, the amount and timing of fuel injection by the fuel injection valve 35, and the ignition timing by the ignition coil 22 are each changed by control values from the ECU 2.

A water jacket 42 is provided within the cylinder block 23. Cooling water flows through the water jacket 42 by means of a cooling water pump (not illustrated). Thus, the cylinder block 23 is cooled. Heat from the cooling water is released into the atmosphere by a radiator (not illustrated). A water temperature sensor 41 is installed in the water jacket 42. The water temperature sensor 41 is a sensor for detecting the temperature of the cooling water (hereinafter also referred to as "water temperature"). The ECU 2 detects the temperature of the cooling water by reading the output of the water temperature sensor 41.

Meanwhile, an oil pan 40 that stores oil is provided under the cylinder block 23. An oil temperature sensor 39 is provided to the oil pan 40. The oil temperature sensor 39 is a sensor for detecting the temperature of oil (hereinafter referred to as "oil temperature"). The ECU 2 detects the oil temperature by reading the output of the oil temperature sensor 39.

In addition, an oil jet unit 53 is attached to the cylinder block 23. The oil jet unit 53 cools the piston 25 by spraying oil onto the back side of the piston 25. The oil jet unit 53 is fastened and fixed to a mounting surface 54 of the cylinder block 23 using a fixing bolt 55 in such a manner as to avoid interference with a connecting rod 50, the crankshaft, and the like.

The amount of oil sprayed by the oil jet unit 53 per unit time (hereinafter also referred to as "oil jet flow rate") varies depending on the oil discharge pressure of the variable displacement oil pump 57 connected to the oil jet unit 53. In addition, the oil jet flow rate also varies depending on the degree of opening of the valve mechanism built into the oil jet unit 53. The oil discharge pressure of the variable displacement oil pump 57 and the degree of opening of the valve mechanism built into the oil jet unit 53 are each changed by control values sent from the ECU 2. The oil discharge pressure is the pressure at which the variable displacement oil pump 57 discharges oil.

An oil supply passage 56 is provided in the cylinder block 23. The oil supply passage 56 is a passage for supplying oil to an oil supply site including the oil jet unit 53. The oil stored in the oil pan 40 is pressurized by the variable displacement oil pump 57. The oil pressurized by the variable displacement oil pump 57 is supplied to the oil jet unit 53 through the oil supply passage 56, and is also supplied to a lubrication site, hydraulically operated equipment, and the like.

Typical structures of the oil jet unit 53 include a die-cast type, a brazed two-piece type, and a brazed integrated type. If the structure of the oil jet unit 53 is of the die-cast type or brazed two-piece type, the oil jet unit 53 is typically fastened and fixed to the cylinder block 23 by the fixing bolt 55 having a built-in check ball. In addition, if the structure of the oil jet unit 53 is of the brazed integrated type and has a built-in valve mechanism, the oil jet unit 53 is fastened and fixed to the cylinder block 23 by a general fixing bolt having no built-in check ball.

Here, if the fixing bolt 55 for fixing the oil jet unit 53 has a built-in check ball, the check ball is biased by a spring in a direction to block the oil supply passage 56. The oil pressurized by the variable displacement oil pump 57 is supplied to the oil jet unit 53 when the pressure of oil in the oil supply passage 56 (main gallery), that is, the hydraulic pressure, exceeds the set load of the spring. In other words, the oil jet unit 53 is configured to spontaneously spray oil when the pressure of oil supplied to the oil supply passage 56 of the internal combustion engine 13 reaches or exceeds a predetermined value.

Meanwhile, if the oil jet unit 53 has a built-in valve mechanism, the valve mechanism is, for example, of a solenoid type. In addition, by adjusting the degree of opening of the valve mechanism with the solenoid, the oil jet of the oil jet unit 53 is stopped or the oil jet flow rate is adjusted.

Figure 3:
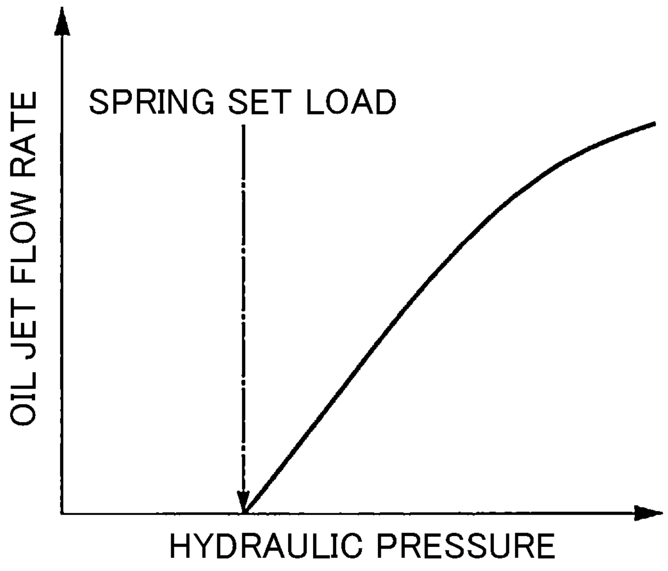
FIG. 3 is an explanatory diagram illustrating the general relationship between the hydraulic pressure and oil jet flow rate in an oil jet unit with a check ball built into a fixing bolt.

FIG. 3 is an explanatory diagram illustrating the general relationship between the hydraulic pressure and oil jet flow rate in an oil jet unit with a check ball built into a fixing bolt.

As illustrated in FIG. 3, when the hydraulic pressure exceeds the set load of the spring, oil jetting begins and the oil jet flow rate increases as the oil pressure rises.

Figure 4:
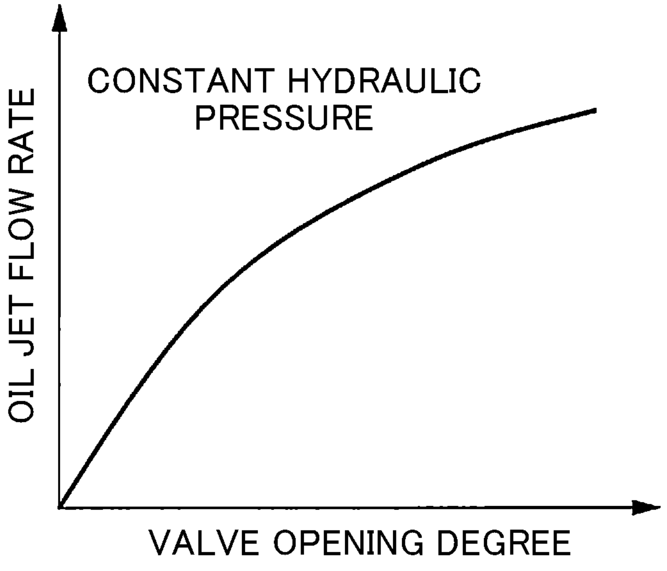
FIG. 4 is a characteristic diagram illustrating the general relationship between the degree of valve opening and oil jet flow rate in an oil jet unit having a built-in valve mechanism.

FIG. 4 is a characteristic diagram illustrating the general relationship between the degree of valve opening and oil jet flow rate in an oil jet unit having a built-in valve mechanism.

As illustrated in FIG. 4, if the hydraulic pressure is constant, the oil jet flow rate increases as the degree of valve opening increases.

Figure 5:
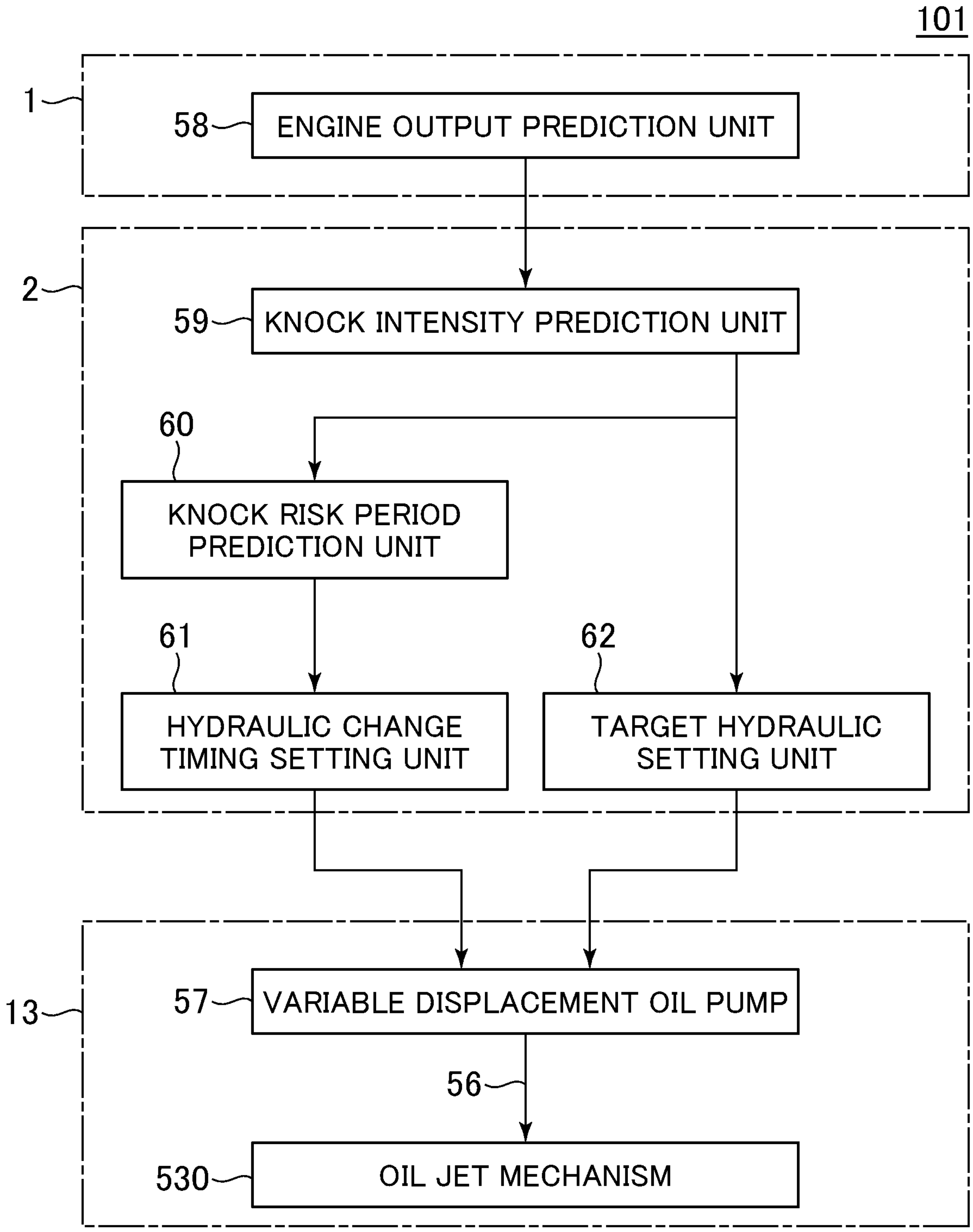
FIG. 5 is a block diagram illustrating the functional configuration of the in-vehicle control device according to the first embodiment.

FIG. 5 is a block diagram illustrating the functional configuration of the in-vehicle control device according to the first embodiment.

As illustrated in FIG. 5, an in-vehicle control device 101 includes an engine output prediction unit 58, a knock intensity prediction unit 59, a knock risk period prediction unit 60, a hydraulic change timing setting unit 61, a target hydraulic setting unit 62, the oil supply passage 56, the variable displacement oil pump 57, and an oil jet mechanism 530. The knock risk period prediction unit 60 predicts a future knock occurrence period as a knock risk period, and functions as a knock occurrence period prediction unit. The oil jet mechanism 530 includes the oil jet unit 53 and fixing bolt 55 described above. In the first embodiment, as an example, the oil jet unit 53 is fixed to the cylinder block 23 by the fixing bolt 55 with a built-in check ball.

Among the above-described components of the in-vehicle control device 101, the engine output prediction unit 58 is installed in the VCU 1. The knock intensity prediction unit 59, the knock risk period prediction unit 60, the hydraulic change timing setting unit 61, and the target hydraulic setting unit 62 are installed in the ECU 2. In addition, the variable displacement oil pump 57, the oil supply passage 56, and the oil jet mechanism 530 are installed in the internal combustion engine 13. However, the components installed in the VCU 1 and the ECU 2 are not limited to the example illustrated in FIG. 5. For example, the engine output prediction unit 58 may be installed in the ECU 2. Alternatively, the knock intensity prediction unit 59, the knock risk period prediction unit 60, the hydraulic change timing setting unit 61, and the target hydraulic setting unit 62 may be installed in the VCU 1.

The engine output prediction unit 58 in the VCU 1 predicts the output of the internal combustion engine 13 during a future prediction period on the basis of the positional information of the automobile 100 acquired from the navigation device 11*a* (see FIG. 1) that measures the current position of the automobile 100, traffic information related to the route to the destination, information acquired by the vehicle-mounted camera 11*b* and vehicle-mounted radar 11*c* mounted in the automobile 100, control information of the internal combustion engine 13, and the like. The future prediction period is, for example, from the present to 30 seconds ahead. The extent to which the prediction period is set from the present can be optionally changed. The output of the internal combustion engine 13 is defined, for example, by the torque and rotational speed of the internal combustion engine 13. In the following description, the output of the internal combustion engine 13 is also referred to as "engine output." Moreover, the torque of the internal combustion engine 13 is also referred to as "engine torque," and the rotational speed of the internal combustion engine 13 is also referred to as "engine speed."

The engine output prediction unit 58 predicts the engine output, which is the future output of the internal combustion engine 13. If, for example, an uphill slope is predicted 10 seconds from the present, the engine output prediction unit 58 predicts a higher engine torque and a higher engine speed as the engine output after 10 seconds, in order to increase the output of the internal combustion engine 13 after 10 seconds. Furthermore, if, for example, a downhill slope is predicted 20 seconds from the present, the engine output prediction unit 58 predicts a lower engine torque and a lower engine speed as the engine output after 20 seconds, in order to reduce the output of the internal combustion engine 13 after 20 seconds. These combinations of engine torque and engine speed are obtained as, for example, the most fuel-efficient combination for the predicted engine output. The future engine output during the prediction period is obtained in the engine output prediction unit 58 as time-series discrete data, for example, every 0.1 seconds. In addition, the most fuel-efficient combination described above is obtained, for example, by a reference table or correlation equation stored in advance in the ECU 2. Further, the reference table or correlation equation is created by a calibration test of the internal combustion engine 13 and is stored in the ECU 2.

The knock intensity prediction unit 59 predicts a future knock intensity on the basis of the engine output predicted by the engine output prediction unit 58. The knock intensity prediction unit 59 obtains the knock intensity during the prediction period for each time-series discrete data point of future engine output on the basis of the future engine output during the prediction period described above. Here, the knock intensity is obtained, for example, by referring to a map that uses as indexes the future engine torque and engine speed during the prediction period. In other words, the knock intensity prediction unit 59 predicts a future knock intensity on the basis of the engine torque and engine speed, which are the engine outputs predicted by the engine output prediction unit 58. Thus, the knock intensity can be accurately predicted by taking into account the differences in knock intensity at the engine operating points (combinations of engine torque and engine speed).

The knock risk period prediction unit 60 predicts a knock risk period, which is the period of future knock occurrence, on the basis of the knock intensity predicted by the knock intensity prediction unit 59. The knock risk period is the period of time during which a knock may occur in the future. The knock risk period prediction unit 60 predicts the period of time during which the knock intensity predicted by the knock intensity prediction unit 59 is equal to or greater than a predetermined knock threshold value as a knock risk period (knock occurrence period). This allows the knock risk period to be predicted with high accuracy.

The hydraulic change timing setting unit 61 sets a hydraulic pressure change timing on the basis of the knock risk period predicted by the knock risk period prediction unit 60. The hydraulic pressure is the oil discharge pressure from the variable displacement oil pump 57. The hydraulic change timing set by the hydraulic change timing setting unit 61 includes a hydraulic pressure rise timing and a hydraulic pressure decrease timing. The hydraulic change timing setting unit 61 corresponds to an oil jet flow rate change timing setting unit. The oil jet flow rate change timing setting unit sets a timing that precedes the start timing of the knock risk period (future knock occurrence period) predicted by the knock risk period prediction unit 60 by a predetermined amount of time as an increase timing of the oil jet flow rate of the oil jet mechanism 530. In addition, the oil jet flow rate change timing setting unit sets a timing that precedes the end timing of the knock risk period predicted by the knock risk period prediction unit 60 by a predetermined amount of time as a decrease timing of the oil jet flow rate of the oil jet mechanism 530.

The oil jet flow rate change timing setting unit described above corresponds to a cooling timing setting unit. The cooling timing setting unit sets the timing at which the oil jet mechanism 530 serving as a cooling mechanism changes the amount of cooling of the internal combustion engine 13. Specifically, the cooling timing setting unit sets a timing that precedes the start timing of the knock risk period (future knock occurrence period) predicted by the knock risk period prediction unit 60 by a predetermined amount of time as an increase timing of the amount of cooling of the internal combustion engine 13. In addition, the cooling timing setting unit sets a timing that precedes the end timing of the knock risk period predicted by the knock risk period prediction unit 60 by a predetermined amount of time as a decrease timing of the amount of cooling of the combustion chamber 28.

The target hydraulic setting unit 62 sets a target hydraulic pressure for the oil jet mechanism 530 on the basis of the knock intensity predicted by the knock intensity prediction unit 59. The target hydraulic setting unit 62 corresponds to a target oil-jet flow rate setting unit. Moreover, the target oil-jet flow rate setting unit corresponds to a target cooling amount setting unit. The target oil-jet flow rate setting unit sets a target oil-jet flow rate for the oil jet mechanism 530 on the basis of the knock intensity predicted by the knock intensity prediction unit 59. The target cooling amount setting unit sets a target cooling amount for the cooling mechanism on the basis of the knock intensity predicted by the knock intensity prediction unit 59.

In the present embodiment, as an example, the cooling mechanism is constituted by the oil jet mechanism 530. The cooling mechanism cools the combustion chamber 28. The oil jet mechanism 530 cools the piston 25 of the internal combustion engine 13 with a jet of oil, that is, oil jet. The amount of cooling of the piston 25 of the internal combustion engine 13 corresponds to the amount of cooling of the combustion chamber 28. However, the amount of cooling of the combustion chamber 28 is not limited to the amount of cooling of the piston 25. For example, the amount of cooling of the combustion chamber 28 includes the amount of cooling of the cylinder block 23, the amount of cooling of the cylinder head 24, and the like.

The amount of cooling of the piston 25 varies depending on the flow rate of the oil jet from the oil jet unit 53 of the oil jet mechanism 530, that is, the oil jet flow rate. Specifically, the amount of cooling of the piston 25 increases as the oil jet flow rate of the oil jet mechanism 530 increases. In addition, the oil jet flow rate of the oil jet mechanism 530 increases as the hydraulic pressure of the oil jet mechanism 530 (the pressure of the oil supplied to the oil jet unit 53 by the variable displacement oil pump 57) increases. Therefore, the target hydraulic pressure of the oil jet mechanism 530 corresponds to the target oil-jet flow rate of the oil jet mechanism 530. Furthermore, the target oil-jet flow rate of the oil jet mechanism 530 corresponds to the target cooling amount of the cooling mechanism.

The variable displacement oil pump 57 changes the pressure (hydraulic pressure) of oil sent to the oil jet mechanism 530 on the basis of the hydraulic change timing (hydraulic pressure rise timing, hydraulic pressure decrease timing) set by the hydraulic change timing setting unit 61 and the target hydraulic pressure set by the target hydraulic setting unit 62. The pressure of oil sent to the oil jet mechanism 530 varies depending on the oil discharge pressure of the variable displacement oil pump 57. Therefore, the variable displacement oil pump 57 changes the pressure of oil sent to the oil jet mechanism 530 by adjusting the oil discharge pressure.

In the present embodiment, the variable displacement oil pump 57 corresponds to an oil jet flow rate change unit. The oil jet flow rate change unit changes the flow rate of the oil jet from the oil jet mechanism 530 on the basis of the increase timing and decrease timing of the oil flow rate set by the oil jet flow rate change timing setting unit and the target oil-jet flow rate set by the target oil-jet flow rate setting unit.

The oil supply passage 56 is a passage for supplying the oil discharged from the variable displacement oil pump 57 to the oil jet mechanism 530. If the pressure (hydraulic pressure) of oil supplied from the variable displacement oil pump 57 through the oil supply passage 56 exceeds the spring set load of the check ball inside the fixing bolt, the oil jet mechanism 530 sprays oil at a flow rate corresponding to the hydraulic pressure onto the piston 25. In addition, if the oil pressure is less than the spring set load of the check ball, the oil jet mechanism 530 stops spraying oil.

Next, a control method for the internal combustion engine according to the first embodiment will be described with reference to FIGS. 6 to 8.

Figure 6:
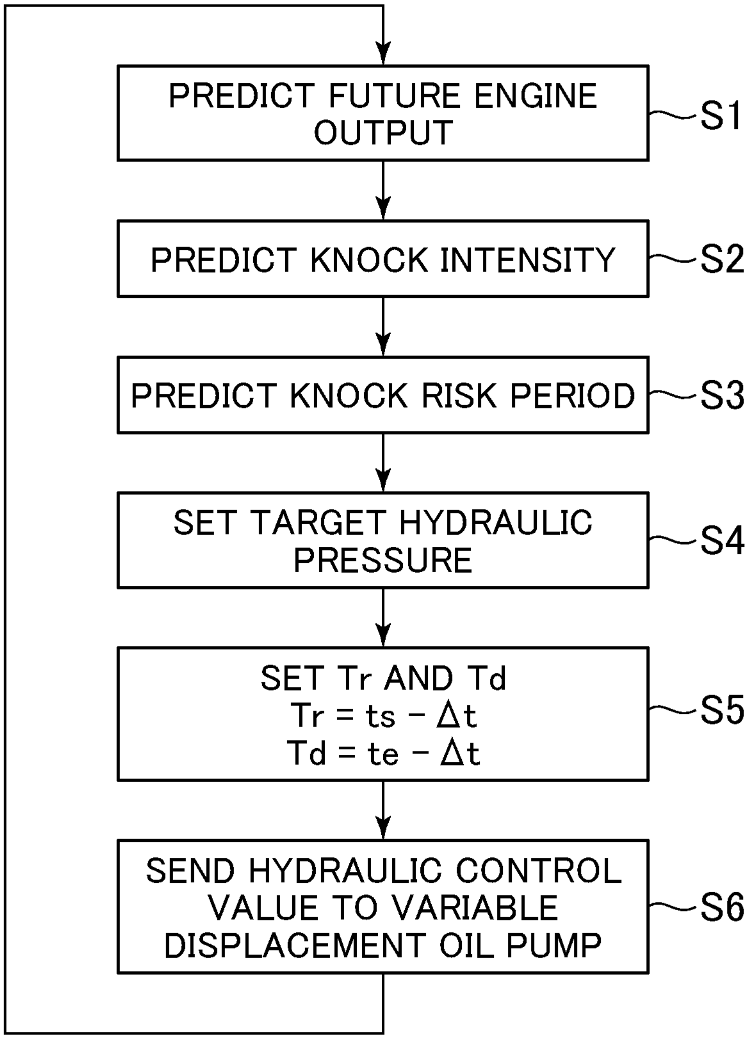
FIG. 6 is a flowchart illustrating a control procedure for the internal combustion engine according to the first embodiment.

FIG. 6 is a flowchart illustrating a control procedure (control method) for the internal combustion engine according to the first embodiment. In addition, FIG. 7 illustrates examples of time histories of predicted torque, predicted rotational speed, predicted knock intensity, and target hydraulic pressure, to supplement the explanation of the control procedure for the internal combustion engine. In FIG. 7, the predicted torque and predicted rotational speed are the engine torque and engine speed, which are the engine outputs predicted by the engine output prediction unit 58. Furthermore, the predicted knock intensity is predicted by the knock intensity prediction unit 59, and the prediction period is a future prediction period.

First, the engine output prediction unit 58 predicts the output of the internal combustion engine 13 during a future prediction period (for example, a period from the present to 30 seconds ahead), that is, the future engine output of the internal combustion engine 13 (step S1). The future engine output predicted by the engine output prediction unit 58 includes the engine torque and periodic rotational speed. The future engine output is predicted on the basis of, for example, the positional information of a host vehicle acquired from the navigation device 11*a*, traffic information related to the route to the destination, altitude information, traffic information around the host vehicle acquired from the vehicle-mounted camera 11*b* and the vehicle-mounted radar 11*c*, past travel history information, and the current control information of the internal combustion engine 13.

In addition, if the automobile 100 travels along a predetermined route, for example, the time series data of the engine output assumed when the automobile 100 travels along the predetermined route may be stored in advance in the storage device of the navigation device 11*a* as time history data, and used to predict future engine output.

Figure 7:
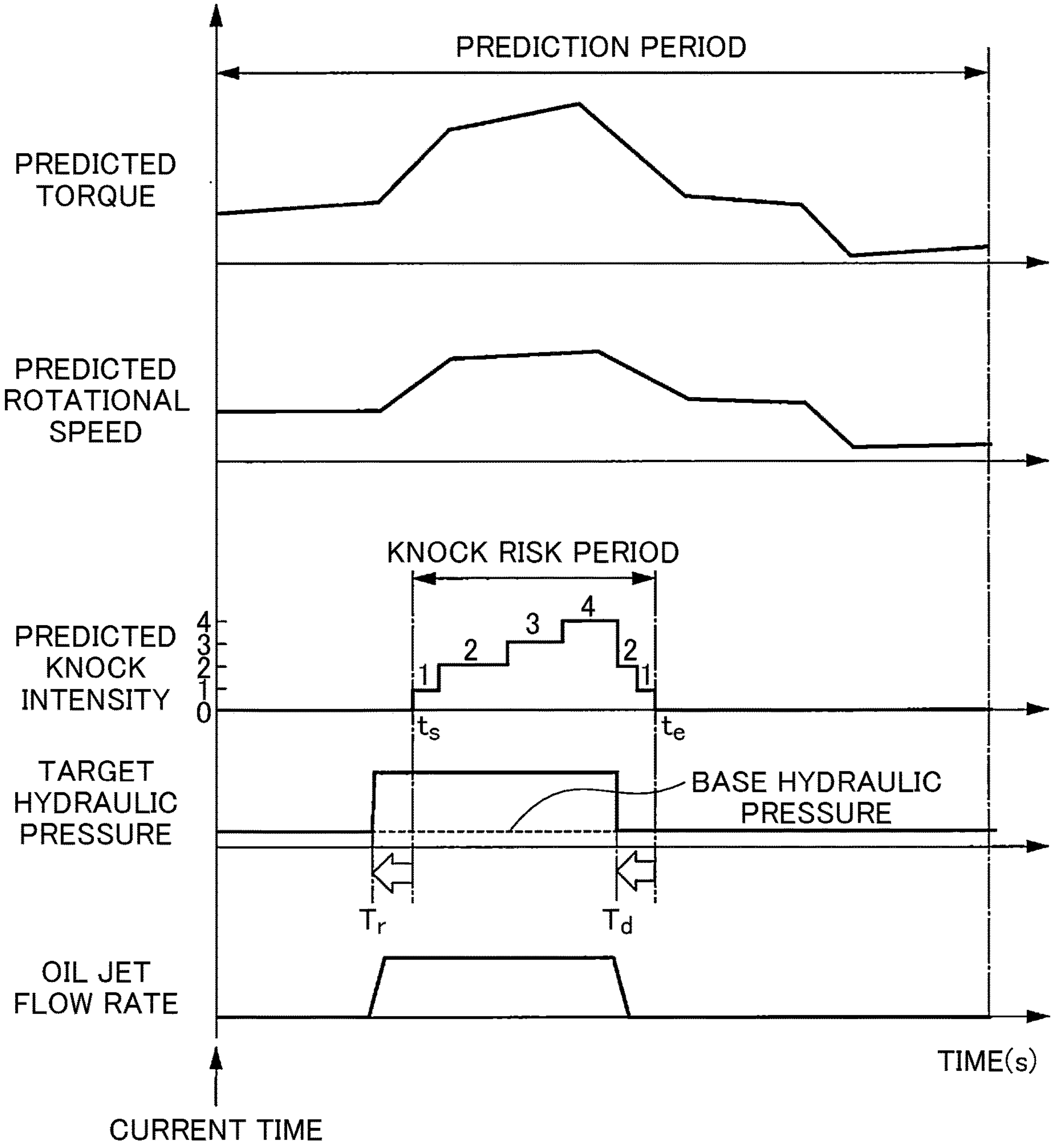
FIG. 7 illustrates examples of time histories of predicted torque, predicted rotational speed, predicted knock intensity, and target hydraulic pressure, to supplement the explanation of the control procedure for the internal combustion engine.

As described above, the torque and rotational speed of the internal combustion engine 13 predicted by the engine output prediction unit 58 are represented by time series data within the prediction period, as shown in the graph of predicted torque and predicted rotational speed in FIG. 7. This time series data is discrete data, and the interval between the discrete data is, for example, 0.1 seconds. The time series discrete data of the engine output predicted by the engine output prediction unit 58 is sent from the engine output prediction unit 58 to the knock intensity prediction unit 59.

Next, the knock intensity prediction unit 59 obtains a knock intensity during the prediction period for each time-series discrete data point of the engine output on the basis of the engine output predicted by the engine output prediction unit 58 (step S2). The knock intensity is obtained, for example, by referring to a map that uses as indexes the future torque and rotational speed of the internal combustion engine 13 during the prediction period. In that case, for example, the map stores the knock intensity predicted when the ignition timing of the internal combustion engine 13 is set to the maximum torque ignition timing (MBT) as five index values ranging from 0 (no knock occurrence) to 4 (maximum knock intensity) for each torque and rotational speed of the internal combustion engine 13.

The knock intensity index values are determined on the basis of the results of tests of the internal combustion engine 13 conducted in advance, the results of simulations of the internal combustion engine 13, or the like. Furthermore, the knock intensity also varies depending on physical factors other than the torque and rotational speed of the internal combustion engine 13. Therefore, if the knock intensity index value obtained from the map is corrected taking into account the influence of the above physical factors, the knock intensity can be predicted more accurately. Examples of physical factors that affect the knock intensity include the temperature (intake air temperature) and humidity (intake air humidity) of the intake air, the temperature of the cooling water (water temperature), the temperature of the oil (oil temperature), the intake pressure, the wall temperature of the internal combustion engine 13, the fuel octane rating, the air-fuel ratio, and the exhaust gas recirculation (EGR) rate, and the like. For this reason, the knock intensity index value obtained from the map may be corrected on the basis of at least one of the intake air temperature, intake air humidity, water temperature, oil temperature, intake pressure, the wall temperature of the internal combustion engine 13, the fuel octane rating, the air-fuel ratio, and the EGR rate. The wall temperature of the internal combustion engine 13 includes at least one of the wall temperature of the cylinder head 24, the wall temperature of the cylinder block 23, and the wall temperature of the piston 25.

Specifically, the higher intake air temperature, water temperature, oil temperature, intake pressure, wall temperature of the internal combustion engine 13, and air-fuel ratio, the higher the knock intensity tends to be, compared to when these are lower. Therefore, the knock intensity index value obtained from the map is preferably corrected so that the higher these physical factors are, the greater the knock intensity index value. In addition, the higher the fuel octane rating, intake air humidity, and EGR rate, the lower the knock intensity tends to be, compared to when these are lower. Therefore, the knock intensity index value obtained from the map is preferably corrected so that the higher these physical factors are, the smaller the knock intensity index value.

By correcting the knock intensity predicted by the knock intensity prediction unit 59 on the basis of the above physical factors in this manner, the knock intensity during the prediction period (future) can be predicted more accurately.

In addition to referring to the map as described above, the knock intensity during the prediction period may also be obtained by correlation equations using the above-described multiple physical factors as explanatory variables, or by calculated values using physical model equations. Moreover, as the above physical factors, the present factor value detected by a sensor or the like may be used. Further, the future values of the above physical factors may be predicted on the basis of the engine output predicted by the engine output prediction unit 58, and the knock intensity index value may be corrected using the future values. In particular, the EGR rate and intake pressure are changed by controlling the degree of opening of the EGR valve and throttle valve of the internal combustion engine 13, as well as the opening and closing timing of the intake and exhaust valves, and therefore, by estimating the control state of the internal combustion engine 13 from the predicted engine output and predicting the changes in the EGR rate and intake pressure within the prediction period, the accuracy of predicting the knock intensity can be further improved.

Next, the knock risk period prediction unit 60 predicts a knock risk period on the basis of the knock intensity predicted by the knock intensity prediction unit 59 (step S3). In that case, the knock risk period prediction unit 60 receives the knock intensity index value as time series discrete data from the knock intensity prediction unit 59 and predicts the knock risk period using the time series discrete data. Furthermore, the knock risk period prediction unit 60 predicts, for example, a section where the knock intensity index value is equal to or greater than 1 (a predetermined knock threshold value) as a section where a knock is predicted to occur in the future, that is, as a knock risk section.

Next, the target hydraulic setting unit 62 sets the target hydraulic pressure of the oil jet mechanism 530 on the basis of the knock intensity predicted by the knock intensity prediction unit 59 (step S4). The target hydraulic pressure of the oil jet mechanism 530 is set on the basis of the knock intensity during the knock risk period predicted by the knock risk period prediction unit 60.

Figure 8:
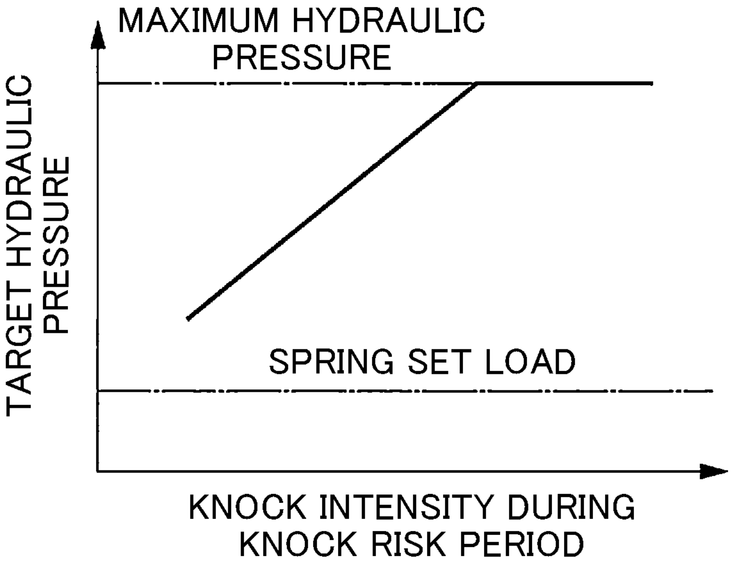
FIG. 8 is an explanatory diagram illustrating an example of the relationship between the knock intensity and the target hydraulic pressure set by a target hydraulic setting unit during a knock risk period.

FIG. 8 is an explanatory diagram illustrating an example of the relationship between the knock intensity and the target hydraulic pressure set by the target hydraulic setting unit 62 during the knock risk period.

As illustrated in FIG. 8, the target hydraulic setting unit 62 sets the target hydraulic pressure so that the higher the knock intensity during the knock risk period, the higher the target hydraulic pressure during the knock risk period. However, the target hydraulic pressure during the knock risk period is set within the range from the spring set load of the check ball in the fixing bolt 55 to the maximum hydraulic pressure limited by the pressure boosting performance of the variable displacement oil pump 57, the pressure resistance of the internal combustion engine 13, or the like. In other words, the target hydraulic pressure during the knock risk period is set within a range more than the spring set load but not more than the maximum hydraulic pressure. In addition, the target hydraulic pressure outside the knock risk period is set to a base hydraulic pressure required to drive equipment other than the oil jet unit 53, such as a variable valve mechanism, and to lubricate each part of the internal combustion engine 13. When controlling the internal combustion engine 13, it is necessary to set the oil discharge pressure of the variable displacement oil pump 57 to the base hydraulic pressure or higher. In addition, in order to prevent the fuel efficiency of the internal combustion engine 13 from deteriorating due to the driving force of the variable displacement oil pump 57, it is desirable that the base hydraulic pressure be as low as possible within a range that still covers oil drive equipment and lubrication. Generally, the base hydraulic pressure is lower than the spring set load of the check ball built into the fixing bolt 55.

The knock intensity during the knock risk period is obtained, for example, as an average value of the knock intensity index values during the knock risk period. Further, the knock intensity during the knock risk period is obtained, for example, as a maximum value of the knock intensity index values during the knock risk period.

Next, the hydraulic change timing setting unit 61 sets a timing for changing the hydraulic pressure of the oil jet mechanism 530 determined by the oil discharge pressure of the variable displacement oil pump 57, that is, a hydraulic change timing (Tr, Td) (step S5). The hydraulic change timing setting unit 61 sets a hydraulic pressure rise timing Tr and a hydraulic pressure decrease timing Td as the hydraulic change timing. The hydraulic pressure rise timing Tr is set as the timing obtained by subtracting a predetermined amount of time Δt from a knock risk period start timing ts, as shown in equation (4) below.

$$Tr = ts - \Delta t \tag{4}$$

Further, the hydraulic pressure decrease timing Td is set as the timing obtained by subtracting the predetermined amount of time Δt from a knock risk period end timing te, as shown in equation (5) below.

$$Td = te - \Delta t \tag{5}$$

In other words, the hydraulic change timing setting unit 61 sets the period of time from hydraulic pressure rise to decrease as a period that precedes the knock risk period by the predetermined amount of time Δt.

Next, the ECU 2 sends the hydraulic change timing (Tr, Td) set by the hydraulic change timing setting unit 61 in step S4 above and the target hydraulic pressure of the oil jet mechanism 530 set by the target hydraulic setting unit 62 in step S5 above to the variable displacement oil pump 57 as hydraulic control values (step S6). Thus, the variable displacement oil pump 57 is controlled by the ECU 2 so that the oil discharge pressure of the variable displacement oil pump 57 becomes the target oil pressure for the knock risk period during the period from time Tr, which is the hydraulic pressure rise timing, to time Td, which is the hydraulic pressure decrease timing. Moreover, the variable displacement oil pump 57 is controlled by the ECU 2 so that the oil discharge pressure of the variable displacement oil pump 57 becomes the base hydraulic pressure before the time Tr or after the time Td.

Figures 9A, 9B, 9C, 9D, 9E, 9F:
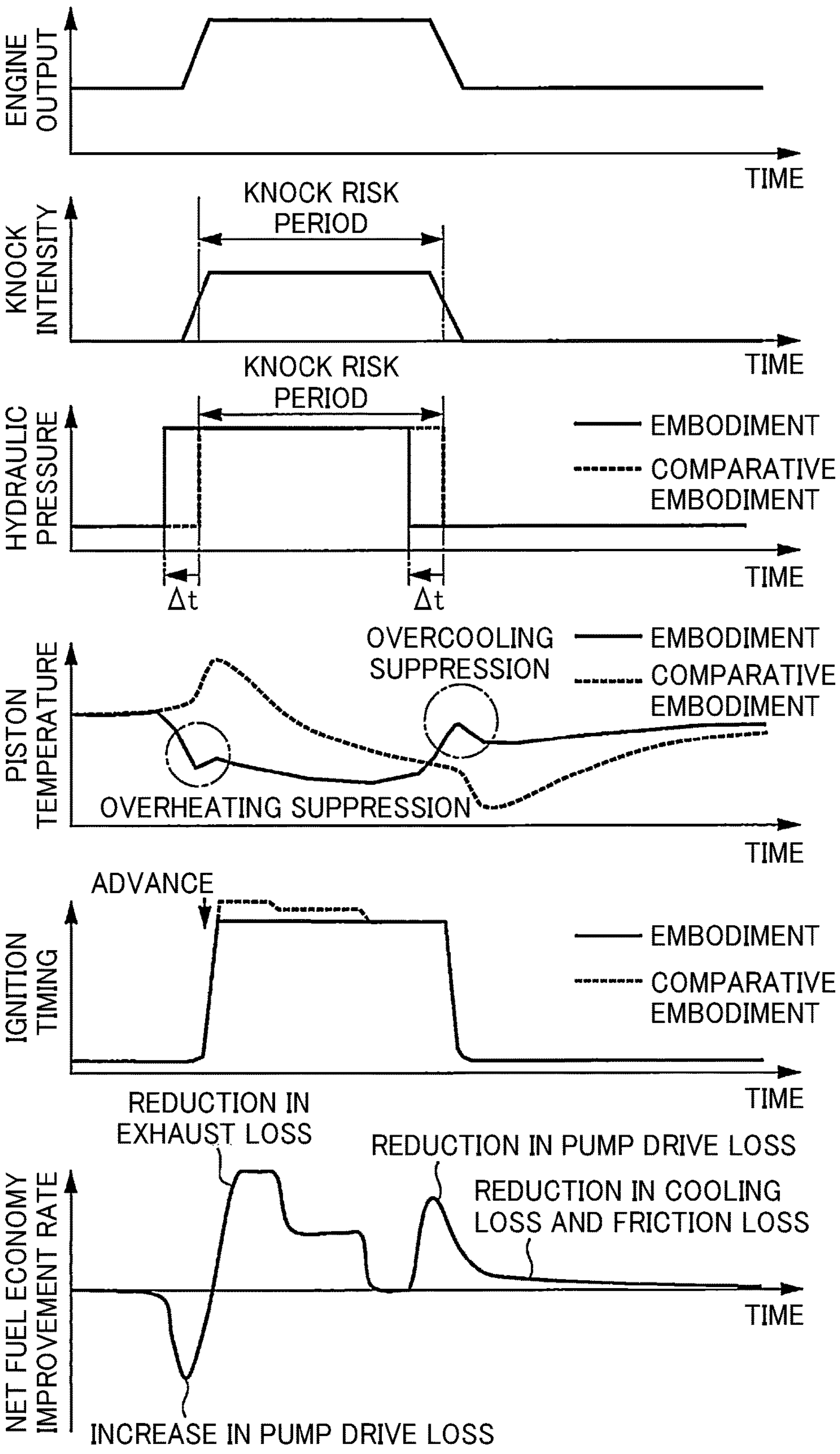
FIGS. 9A-9F illustrate the effect of the first embodiment.

FIG. 9 illustrates the effect of the first embodiment, in which FIG. 9A illustrates the change over time in engine output, FIG. 9B illustrates the change over time in knock intensity, and FIG. 9C illustrates the change over time in hydraulic pressure. In addition, FIG. 9D illustrates the change over time in piston temperature, FIG. 9E illustrates the ignition timing, and FIG. 9F illustrates the net fuel economy improvement rate according to the first embodiment. Furthermore, in FIG. 9B, the period during which the knock intensity is equal to or greater than a predetermined value is defined as a knock risk period. In addition, in FIGS. 9C, 9D, and 9E, the first embodiment is indicated by solid lines, and the comparative embodiment is indicated by dashed lines.

First, in the comparative embodiment, the hydraulic pressure rise timing is the same as the start timing of the knock risk period (the timing at which the engine output switches from low output to high output), and the hydraulic pressure decrease timing is the same as the end timing of the knock risk period (the timing at which the engine output switches from high output to low output).

Meanwhile, in the first embodiment, the hydraulic pressure rise timing precedes the start timing of the knock risk period by the predetermined amount of time Δt, and the hydraulic pressure decrease timing precedes the end timing of the knock risk period by the predetermined amount of time Δt. When the hydraulic pressure rise timing is made to precede the start timing of the knock risk period by the predetermined amount of time Δt in this manner, the oil jet flow rate increase timing also precedes the start timing of the knock risk period by the predetermined amount of time Δt. In addition, when the hydraulic pressure decrease timing is made to precede the end timing of the knock risk period by the predetermined amount of time Δt, the oil jet flow rate decrease timing also precedes the end timing of the knock risk period by the predetermined amount of time Δt. Thus, the amount of cooling of the piston 25 by the oil jet mechanism 530 increases before the temperature of the piston 25 begins to rise due to knock initiation (increase in engine output). Therefore, overheating of the piston 25 in the early stage of the knock risk period can be suppressed. As a result, the ignition timing can be advanced in the early stage of the knock risk period compared to the comparative embodiment. When the ignition timing is advanced, the period of combustion is advanced accordingly, and the amount of heat generated by the internal combustion engine 13 during the expansion stroke is relatively reduced. Furthermore, when the amount of heat generated by the internal combustion engine 13 decreases, the temperature of exhaust gas decreases. Therefore, by advancing the ignition timing as described above, exhaust losses can be reduced.

In addition, according to the first embodiment, the amount of cooling of the piston 25 by the oil jet mechanism 530 decreases before the end of knocking (before the engine output decreases). It is therefore possible to suppress overcooling of the piston 25 after the knock risk period. As a result, after the knock risk period (after the engine output is decreased), the cooling losses can be reduced as compared to the comparative embodiment. In addition, the suppression of piston overcooling reduces the increase in oil viscosity, thereby allowing a reduction in the friction loss generated in a piston sliding part.

Note that in the first embodiment, the hydraulic pressure rises prior to the start of the knock risk period, and there is a concern that, before the start of the knock risk period, the net fuel economy may deteriorate compared to the comparative embodiment due to the increase in oil pump drive loss. However, in the first embodiment, the hydraulic pressure decreases prior to the end of the knock risk period, so that before the end of the knock risk period, the net fuel economy is improved compared to the comparative embodiment due to the decrease in oil pump drive loss. Therefore, in the first embodiment, the deterioration in fuel efficiency (increase in pump drive loss) before the start of the knock risk period is offset by the improvement in fuel efficiency (decrease in pump drive loss) before the end of the knock risk period, so that no deterioration in net fuel economy occurs.

Here, the above-mentioned predetermined amount of time $\Delta t$ will be described in detail.

In the first embodiment, the predetermined amount of time $\Delta t$ defines how much the hydraulic pressure rise timing Tr should precede the knock risk period start timing ts. The predetermined amount of time $\Delta t$ also defines how much the hydraulic pressure decrease timing Td should precede the knock risk period end timing te. The predetermined amount of time $\Delta t$ is desirably the step response time $\tau$ of the piston temperature of the internal combustion engine 13. In other words, $\Delta t \approx \tau$ is preferably satisfied. The reason for this is as follows.

For example, if the predetermined amount of time $\Delta t$ is made significantly longer than the step response time $\tau$ of the piston temperature, the piston 25 is over-cooled from before the knock risk period to the early stage of the knock risk period, resulting in an increase in cooling loss. In addition, if the predetermined amount of time $\Delta t$ is made significantly longer than the step response time $\tau$ of the piston temperature, the cooling of the piston 25 before the end of the knock risk period is insufficient, resulting in an increase in the amount of ignition delay.

Meanwhile, if the predetermined amount of time $\Delta t$ is made significantly shorter than the step response time $\tau$ of the piston temperature, the cooling of the piston 25 in the early stage of the knock risk period is insufficient, resulting in an increase in the amount of ignition delay. In addition, if the predetermined amount of time $\Delta t$ is made significantly shorter than the step response time $\tau$ of the piston temperature, the cooling of the piston 25 before the end of the knock risk period becomes excessive, results in an increase in cooling loss.

In contrast, if the predetermined amount of time $\Delta t$ is set to the step response time $\tau$ of the piston temperature, overheating or overcooling of the piston before and after the start of the knock risk period and before and after the end of the knock risk period is suppressed. Therefore, if the predetermined amount of time $\Delta t$ is set to the step response time $\tau$ of the piston temperature, the occurrence of knock can be effectively suppressed, and the cooling loss and friction loss can be reduced.

The step response time $\tau$ of the piston temperature for defining the predetermined amount of time $\Delta t$ is obtained by solving the one-dimensional heat conduction equation shown in [Equation 1] below. In this [Equation 1], T is the temperature of the piston (K), x is the distance in the thickness direction of the piston (m), $\rho$ is the density of the piston (Kg/m$^3$), C is the specific heat of the piston (J/kg·K), and $\lambda$ is the thermal conductivity of the piston (W/m·K).

$$\rho C \frac{dT}{dt} = \lambda \frac{d^2 T}{dx^2} \quad \text{[Equation 1]}$$

Figure 10A:
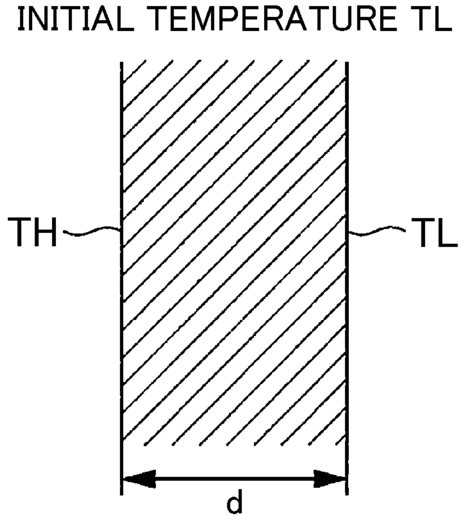
FIGS. 10A and 10B illustrate how to obtain the step response time of piston temperature.
Figure 10B:
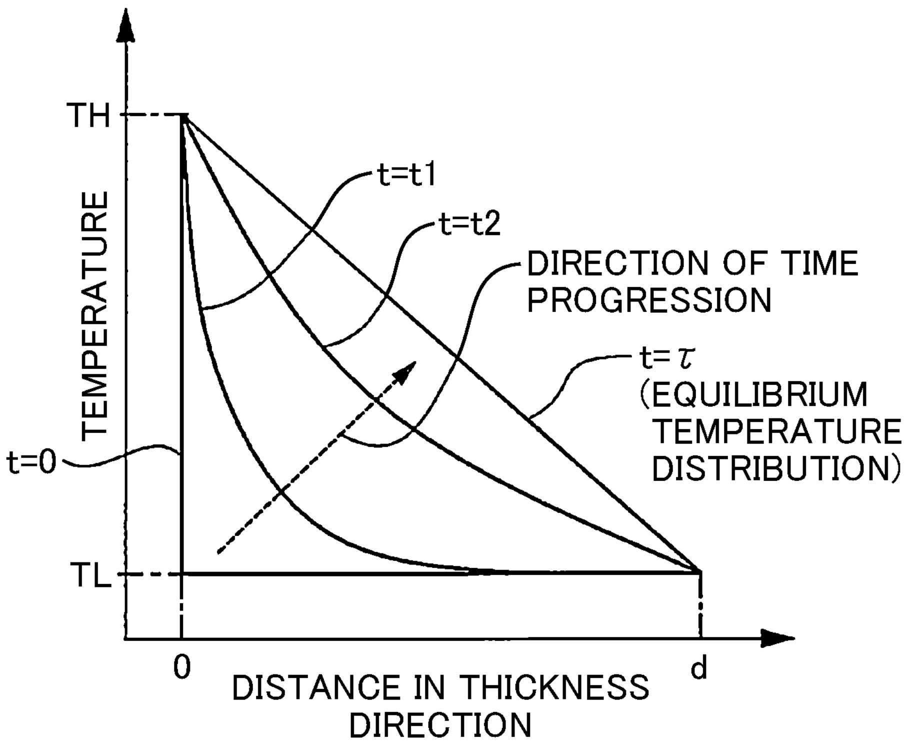

FIG. 10 illustrates how to obtain the step response time of piston temperature, in which FIG. 10A illustrates a model for piston temperature analysis, and FIG. 10B illustrates the analysis results of temperature distribution in the piston. To obtain the step response time of the piston temperature, the piston is modeled as a homogeneous solid with thickness d (mm) and initial temperature TL, as illustrated in FIG. 10A. This model assumes that the piston reciprocates in the left-right direction in FIG. 10A. In addition, in this model, the temperature of the piston wall (piston crown surface) located on the combustion chamber side is TH, and the temperature of the piston wall on the crank side (oil jet unit 53 side) is TL, which is the same as the initial temperature (where TH>TL is satisfied). The step response time $\tau$ of the piston temperature is obtained by solving the above [Equation 1] for the temperature change in the piston when TH and TL are defined as above.

FIG. 10B illustrates the analysis results of temperature distribution in the piston in the piston thickness direction. FIG. 10B illustrates the temperature distributions at times t=0, t1, t2, and $\tau$ (where $0<t1<t2<\tau$ is satisfied) from the start of the analysis. As can be seen, for example, from the temperature distribution at t=t1, the temperature distribution in the piston becomes a concave distribution with a strong curvature in the early stage, shortly after the start of the analysis. However, as can be seen, for example, from the temperature distributions at t=t2 and t=t3, as time passes from the start of the analysis, the curvature of the concave distribution becomes gentler, and eventually the temperature distribution in the piston becomes a linear equilibrium temperature distribution ($t=\tau$). In this case, $\tau$, which is the time required from the start of the analysis to reach the linear equilibrium temperature distribution, is obtained as the step response time of the piston temperature.

The inventors obtained the step response time $\tau$ of the piston temperature by the above method, assuming the piston 25 of the internal combustion engine 13 currently on the market. As a result, the step response time $\tau$ of the piston temperature was found to be in the range of from time t1

(ms) to time t2 (ms) defined by equations (1), (2), and (3) below.

$$t1 = 4.9d^2 \quad (1)$$

$$t2 = 30d^2 \quad (2)$$

$$d = 4V/\pi B^2 \quad (3)$$

where d is the thickness of the piston (mm), V is the volume of the piston ($mm^3$), B is the diameter of the piston (mm), and $\pi$ is the circular constant.

As described above, the predetermined amount of time $\Delta t$ is desirably determined by the step response time $\tau$ of the piston temperature. Therefore, the predetermined amount of time $\Delta t$ is desirably set within the range from the time t1 to the time t2 defined by the above equations (1) to (3).

In addition, if $\Delta tr$ is the amount of time by which the hydraulic pressure rise timing Tr precedes the knock risk period start timing ts, and $\Delta td$ is the amount of time by which the hydraulic pressure decrease timing Td precedes the knock risk period end timing the, $\Delta tr$ and $\Delta td$ need not necessarily be the same. For example, $\Delta tr$ and $\Delta td$ may be set to different values in accordance with the distribution of predicted knock intensity within the knock risk period. For example, if the knock intensity in the early stage of the knock risk period is significantly greater than the knock intensity in the later stage of the knock risk period, it is desirable to further suppress overheating of the piston in the early stage of the knock risk period by setting $\Delta tr > \Delta td$ and accelerating the increase timing of the amount of piston cooling by oil jet mechanism 530. In addition, for example, if the knock intensity in the later stage of the knock risk period is significantly greater than the knock intensity in the early stage of the knock risk period, it is desirable to suppress the increase in knock in the later stage of the knock period by setting $\Delta tr < \Delta td$ and delaying the decrease timing of the amount of piston cooling by the oil jet mechanism 530.

Second Embodiment

Next, an in-vehicle control device according to a second embodiment will be described.

Figure 11:
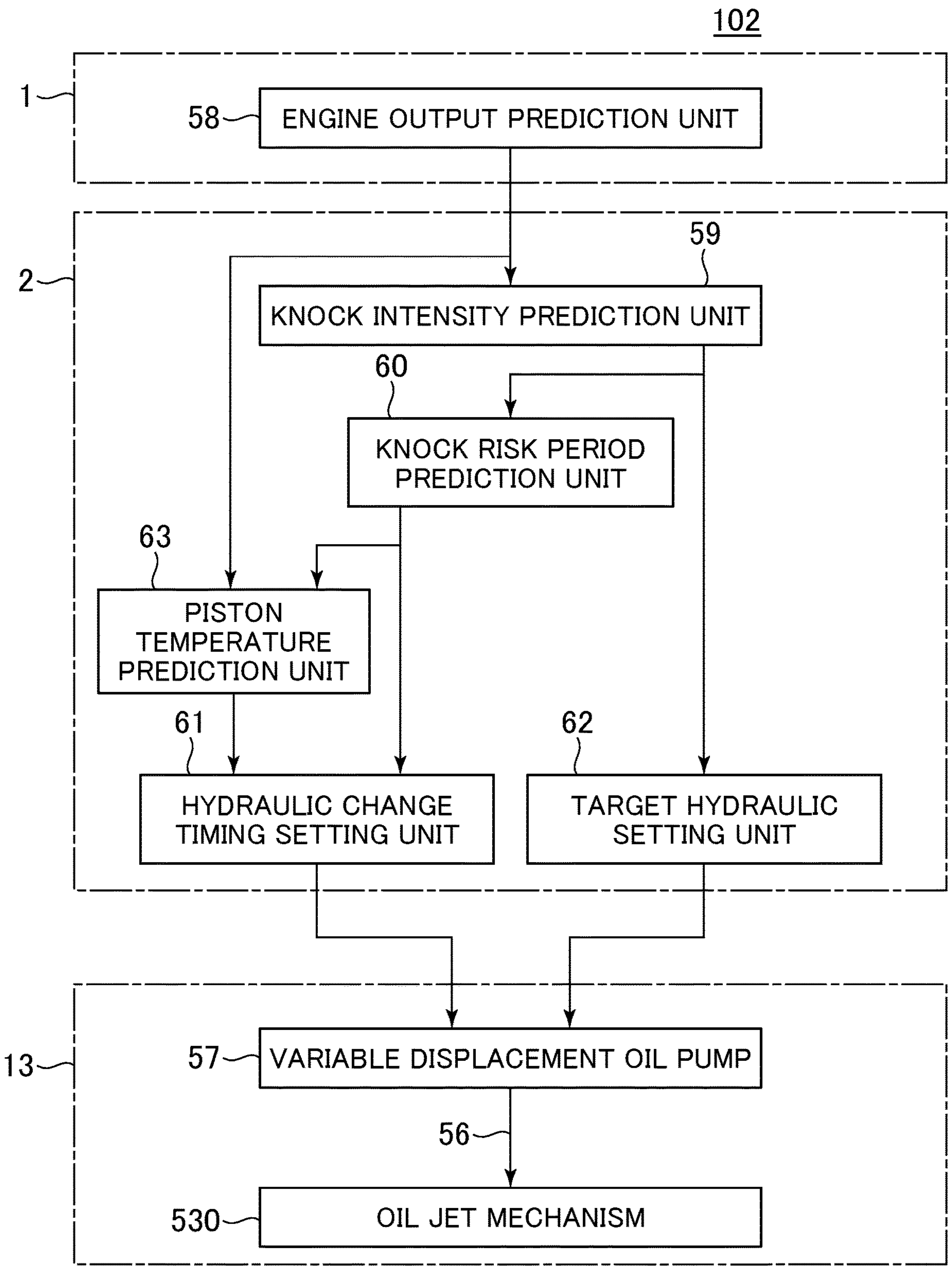
FIG. 11 is a block diagram illustrating the functional configuration of an in-vehicle control device according to a second embodiment.

FIG. 11 is a block diagram illustrating the functional configuration of the in-vehicle control device according to the second embodiment.

As illustrated in FIG. 11, the in-vehicle control device 102 differs from the first embodiment (FIG. 5) described above in that a piston temperature prediction unit 63 is added, but the other components are the same as those in the first embodiment.

The piston temperature prediction unit 63 predicts a piston temperature (hereinafter also referred to as the "pre-knock piston temperature") prior to the start timing of the knock risk period (future knock occurrence period) predicted by the knock risk period prediction unit 60. The piston temperature prediction unit 63 also predicts the pre-knock piston temperature on the basis of the engine output (engine torque and engine speed during the prediction period) predicted by the engine output prediction unit 58, or the like. Then, the hydraulic change timing setting unit 61, which functions as an oil jet flow rate change timing setting unit, sets a hydraulic pressure rise timing and a hydraulic pressure decrease timing on the basis of the predicted knock risk period and the predicted piston temperature as described above. Specifically, if the piston temperature predicted by the piston temperature prediction unit 63 is lower than a predetermined temperature, the hydraulic change timing setting unit 61 delays the hydraulic pressure rise timing compared to when the piston temperature predicted by the piston temperature prediction unit 63 is higher than the predetermined temperature. To put this in terms of the oil jet flow rate change timing setting unit, if the piston temperature predicted by the piston temperature prediction unit 63 is lower than a predetermined temperature, the oil jet flow rate change timing setting unit delays the oil jet flow rate increase timing compared to when the piston temperature predicted by the piston temperature prediction unit 63 is higher than the predetermined temperature. Note that the piston temperature prediction unit 63 may predict the pre-knock piston temperature not only on the basis of the predicted engine power, but also on the basis of, for example, the water temperature and oil temperature in the prediction period or the engine output, water temperature, and oil temperature before the prediction period.

Next, a control method for the internal combustion engine according to the second embodiment will be described with reference to FIGS. 12 and 13.

Figure 12:
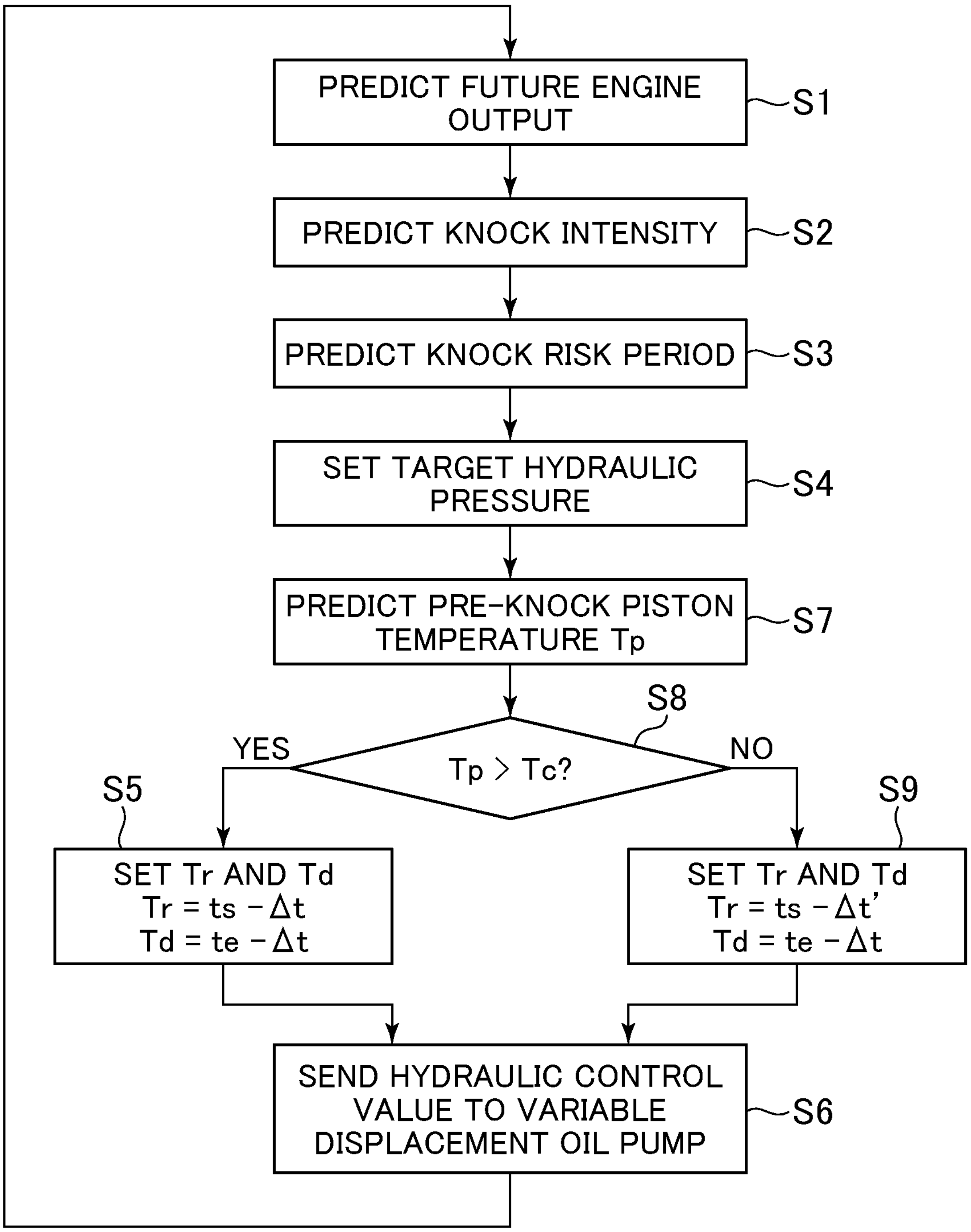
FIG. 12 is a flowchart illustrating a control procedure for the internal combustion engine according to the second embodiment.

FIG. 12 is a flowchart illustrating a control procedure (control method) for the internal combustion engine according to the second embodiment. In this flowchart, steps S1 to S4 and step S6 are the same as steps S1 to S4 and step S6 in the control procedure for the internal combustion engine according to the first embodiment described above, and therefore the description thereof will be omitted here.

First, in step S7 after step S4, the piston temperature prediction unit 63 predicts a pre-knock piston temperature Tp. Here, "pre-knock" refers to any one timing between the present and the knock risk period start timing. In other words, "pre-knock" means a timing that is later than the present (current time) and at or before the knock risk period start timing. To give an example, "pre-knock" is a timing that is the same as the knock risk period start timing, or a timing that is 5 seconds before the knock risk period start timing.

The pre-knock piston temperature Tp is predicted, for example, by physical model equations, correlation equations, map references, or the like, using as explanatory variables the future engine output during the prediction period, the current water temperature or oil temperature, the control information of the internal combustion engine 13, or the output history of the internal combustion engine 13 from the past to the present.

Next, the hydraulic change timing setting unit 61 compares the piston temperature Tp predicted by the piston temperature prediction unit 63 as described above with a predetermined temperature threshold value Tc (for example, 100° C.) (step S8). If, as a result of this comparison, the predicted piston temperature Tp is higher than the temperature threshold value Tc, the hydraulic change timing setting unit 61 sets the hydraulic pressure rise timing Tr as the timing obtained by subtracting the predetermined amount of time $\Delta t$ from the knock risk period start timing ts, as in the first embodiment described above, and also sets the hydraulic pressure decrease timing Td as the timing obtained by subtracting the predetermined amount of time $\Delta t$ from the knock risk period end timing the (step S5).

In contrast, if the predicted piston temperature Tp is equal to or lower than the temperature threshold value Tc, the hydraulic change timing setting unit 61 sets the hydraulic pressure rise timing Tr and the hydraulic pressure decrease timing Td as follows (step S9).

First, the hydraulic pressure rise timing Tr is set as the timing obtained by subtracting a predetermined amount of time Δt' from the knock risk period start timing ts, as shown in equation (6) below.

$$Tr = ts - \Delta t' \tag{6}$$

In this equation (6), the predetermined amount of time Δt' is shorter than the predetermined amount of time Δt described above.

In addition, the hydraulic pressure decrease timing Td is set as the timing obtained by subtracting the predetermined amount of time Δt from the knock risk period end timing te, as shown in the above equation (5).

As described above, the control procedure for the internal combustion engine according to the second embodiment differs from the control procedure for the internal combustion engine according to the first embodiment in that when the pre-knock piston temperature is equal to or lower than the temperature threshold value, the hydraulic pressure rise timing Tr is delayed compared to when the pre-knock piston temperature is higher than the temperature threshold value.

The effects of the second embodiment will be described below.

First, in the early stage of the knock risk period, the temperature attained due to piston overheating caused by the delayed temperature response of the piston is lower when the pre-knock piston temperature is sufficiently low than when the pre-knock piston temperature is high. For this reason, when the pre-knock piston temperature is sufficiently low (for example, lower than 100° C.), the increase in the amount of ignition delay in the early stage of the knock risk period is suppressed even if the time between the hydraulic pressure rise timing and the start of the knock risk period is shorter than the step response time τ of the piston temperature.

Therefore, in the control procedure for the internal combustion engine according to the second embodiment, when the pre-knock piston temperature is equal to or lower than the temperature threshold value, the hydraulic pressure rise timing Tr is delayed compared to when the pre-knock piston temperature is higher than the temperature threshold value. As a result, when the pre-knock piston temperature is equal to or lower than the temperature threshold value, the period during which the hydraulic pressure is made high is shorter than when the pre-knock piston temperature is higher than the temperature threshold value. Therefore, according to the second embodiment, it is possible to reduce the work required to pressurize the oil by the oil pump (work for rotating the inner rotor of the pump), that is, the loss due to oil pump drive work, can be reduced. In addition, before the knock risk period, the amount of cooling with an oil jet is suppressed, so that both the cooling loss and the friction loss can be reduced. The amount of cooling with an oil jet is the amount of heat removed from the piston by the oil jet.

If the pre-knock piston temperature Tp is equal to or lower than the temperature threshold value Tc, the predetermined amount of time Δt' by which the hydraulic pressure rise timing is preceded may be changed depending on the pre-knock piston temperature Tp.

Figure 13:
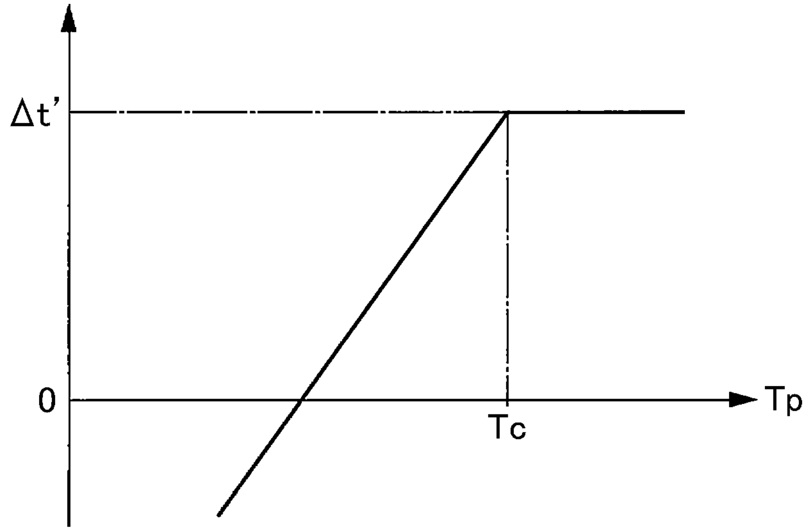
FIG. 13 is an explanatory diagram illustrating an example of the relationship between pre-knock piston temperature and hydraulic pressure rise lead time in the second embodiment.

FIG. 13 is an explanatory diagram illustrating an example of the relationship between pre-knock piston temperature and hydraulic pressure rise lead time in the second embodiment. FIG. 13 exemplifies the relationship between the pre-knock piston temperature Tp and the predetermined amount of time Δt' when changing the predetermined amount of time Δt' in accordance with the pre-knock piston temperature Tp.

The piston overheat temperature in the early stage of the knock risk period decreases as the pre-knock piston temperature Tp is low. Therefore, as illustrated in FIG. 13, the drive loss, cooling loss, and friction loss of the oil pump can be further reduced by decreasing the predetermined amount of time Δt' as the pre-knock piston temperature Tp becomes lower. In addition, if the pre-knock piston temperature Tp is very low, the predetermined amount of time Δt' may be set to a negative value and the hydraulic pressure rise timing may be set to after the start of the knock risk period.

In this manner, if the pre-knock piston temperature Tp is lower than the temperature threshold value Tc, the timing of piston cooling by the oil jet can be finely set in accordance with the state of the internal combustion engine 13 by changing the predetermined amount of time Δt' by which the hydraulic pressure rise timing is preceded in accordance with the pre-knock piston temperature Tp. Therefore, the drive loss, cooling loss, and friction loss of the oil pump can be further reduced without causing an increase in ignition delay due to knock.

Third Embodiment

The first embodiment and second embodiment described above have exemplified cases where the variable displacement oil pump 57 is employed as the hydraulic pump and the oil jet flow rate is controlled by the level of the discharge pressure of the variable displacement oil pump 57. Meanwhile, if the oil jet unit 53 has a built-in valve mechanism, it is possible to stop the oil jet of the oil jet unit 53 or adjust the oil jet flow rate by adjusting the degree of opening of the valve mechanism without changing the discharge pressure (hydraulic pressure) of the hydraulic pump. Therefore, in the third embodiment, a case where the oil jet unit 53 has a built-in valve mechanism and a fixed displacement oil pump is employed as the hydraulic pump will be described as an example.

Figure 14:
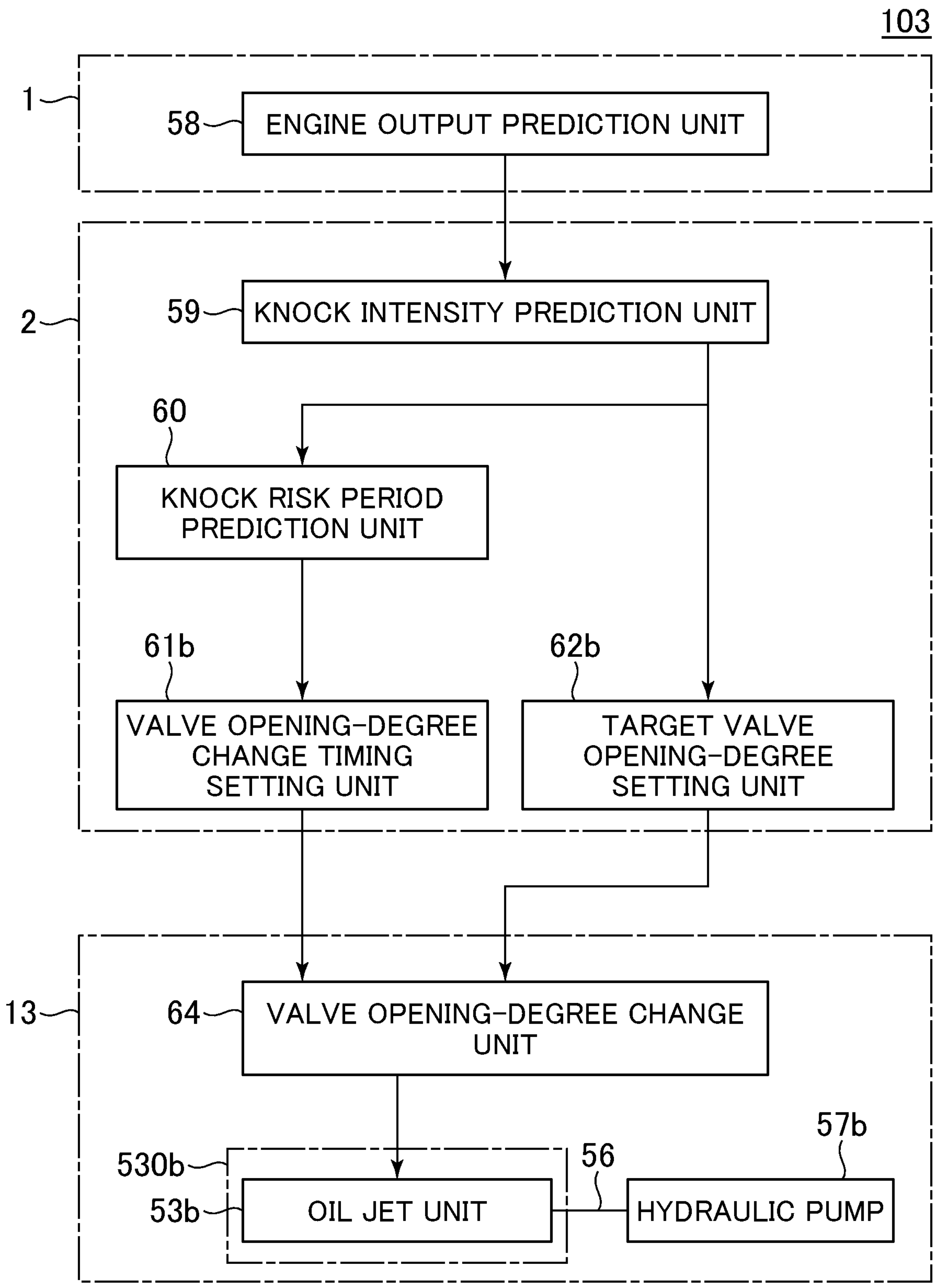
FIG. 14 is a block diagram illustrating the functional configuration of an in-vehicle control device according to a third embodiment.

FIG. 14 is a block diagram illustrating the functional configuration of an in-vehicle control device according to the third embodiment.

As illustrated in FIG. 14, the in-vehicle control device 103 includes the engine output prediction unit 58, the knock intensity prediction unit 59, the knock risk period prediction unit 60, a valve opening-degree change timing setting unit **61*b*, a target valve opening-degree setting unit 62*b*, a valve opening-degree change unit 64, an oil jet mechanism 530*b*, and a hydraulic pump 57*b*. In addition, the oil jet mechanism 530*b* includes an oil jet unit 53*b*. The oil jet unit 53*b* cools the piston 25 of the internal combustion engine 13 with a jet of oil (oil jet). Furthermore, the oil jet unit 53*b* sprays oil, which is supplied from the hydraulic pump 57*b* through the oil supply passage 56, onto the piston 25 at a flow rate according to the degree of opening of the valve mechanism built into the oil jet unit 53*b***.

Among the above-described components of the in-vehicle control device 103, the engine output prediction unit 58, the knock intensity prediction unit 59, the knock risk period prediction unit 60, and the oil supply passage 56 are the same as those in the first embodiment, and therefore the description thereof will be omitted.

The oil jet unit **53*b* of the oil jet mechanism 530*b* has a built-in valve mechanism (not illustrated). Therefore, the oil jet flow rate, which is the flow rate of oil sprayed by the oil jet unit 53*b*, depends on the degree of opening of the valve mechanism. The hydraulic pump 57***b* is a fixed displacement oil pump. In the present embodiment, the oil pressure (hydraulic pressure) determined by the discharge pressure of the hydraulic pump 57*b* is constant.

The valve opening-degree change timing setting unit 61*b* sets a change timing for changing the degree of opening of the valve mechanism (the degree of valve opening) built into the oil jet unit 53*b*. The valve opening-degree change timing setting unit 61*b* sets the valve opening timing and valve closing timing of the valve mechanism on the basis of the knock risk period predicted as described above. Specifically, the valve opening-degree change timing setting unit 61*b* sets a timing that precedes the start timing of the knock risk period (knock occurrence period) predicted by the knock risk period prediction unit 60 by a predetermined amount of time, as the valve opening timing of the valve mechanism. The valve opening-degree change timing setting unit 61*b* also sets a timing that precedes the end timing of the knock risk period predicted by the knock risk period prediction unit 60 by a predetermined amount of time, as the valve closing timing of the valve mechanism. The valve opening-degree change timing setting unit 61*b* corresponds to the oil jet flow rate change timing setting unit.

The target valve opening-degree setting unit 62*b* sets the target degree of valve opening of the above-described valve mechanism on the basis of the knock intensity predicted by the knock intensity prediction unit 59. The target valve opening-degree setting unit 62*b* corresponds to the target oil-jet flow rate setting unit.

The valve opening-degree change unit 64 changes the degree of opening of the valve mechanism on the basis of the above valve opening timing and valve closing timing set by the valve opening-degree change timing setting unit 61*b* and the above target degree of valve opening set by the target valve opening-degree setting unit 62*b*. If the oil jet unit 53*b* has a built-in valve mechanism, the valve opening-degree change unit 64 changes the degree of opening of the valve mechanism by a solenoid (see, for example, Japanese Unexamined Patent Application Publication No. Hei06(1994)-042346). The valve opening-degree change unit 64 corresponds to the oil jet flow rate change unit.

Next, a control method for the internal combustion engine according to the third embodiment will be described with reference to FIGS. 15 and 16.

Figure 15:
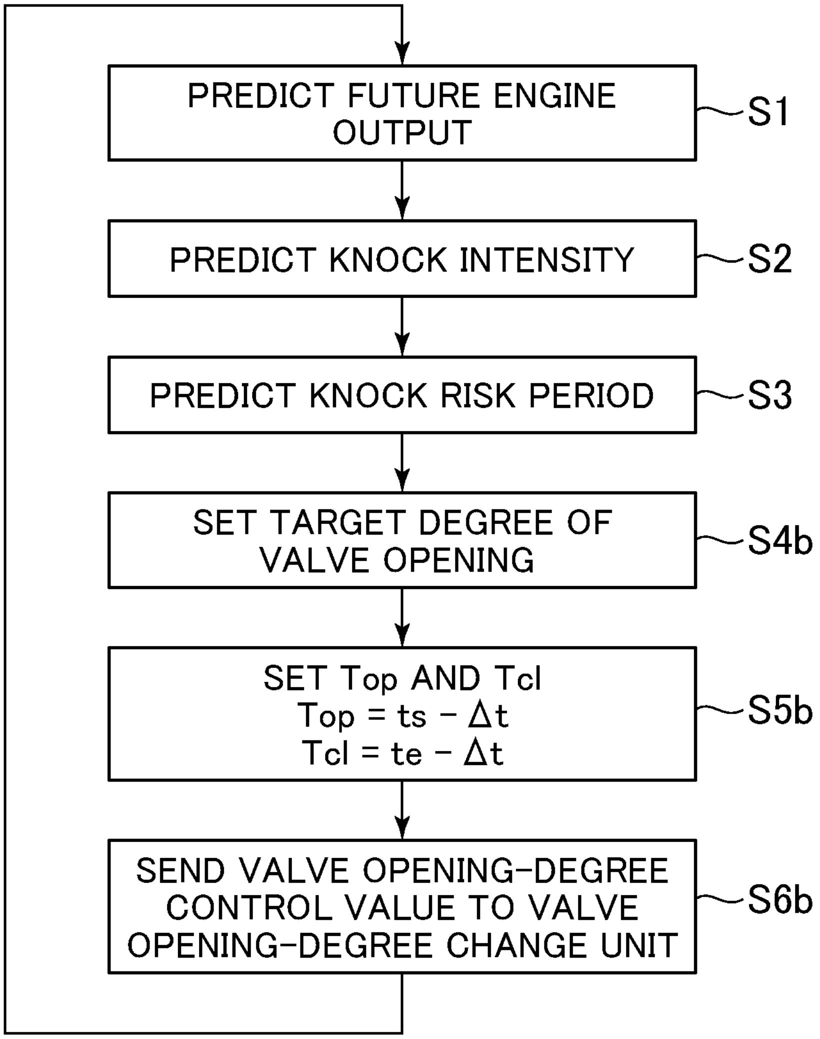
FIG. 15 is a flowchart illustrating a control procedure for the internal combustion engine according to the third embodiment.

FIG. 15 is a flowchart illustrating a control procedure (control method) for the internal combustion engine according to the third embodiment. In this flowchart, steps S1 to S3 are the same as steps S1 to S3 in the control procedure for the internal combustion engine according to the first embodiment described above, and therefore the description thereof will be omitted here.

First, in step S4*b* after step S3, the target valve opening-degree setting unit 62*b* sets the target degree of valve opening of the valve mechanism in the oil jet unit 53*b* on the basis of the knock intensity prediction result in step S2.

Figure 16:
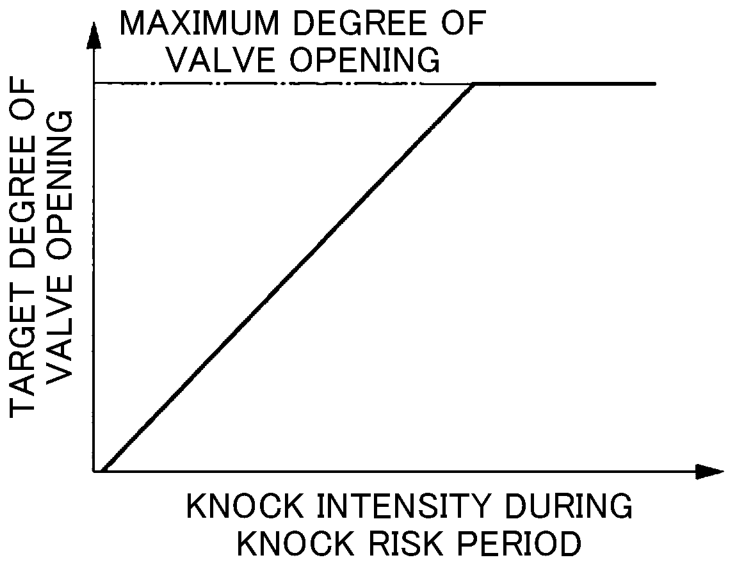
FIG. 16 is an explanatory diagram illustrating an example of the relationship between the target degree of valve opening and the knock intensity during the knock risk period in the third embodiment.

FIG. 16 is an explanatory diagram illustrating an example of the relationship between the target degree of valve opening and the knock intensity during the knock risk period in the third embodiment.

As illustrated in FIG. 16, the target valve opening-degree setting unit 62*b* sets the target degree of valve opening so that the target degree of valve opening becomes larger as the knock intensity during the knock risk period increases. However, the target degree of valve opening is set to be equal to or less than the maximum degree of valve opening of the valve mechanism built into the oil jet unit 53*b*.

Next, the valve opening-degree change timing setting unit 61*b* sets a timing for changing the oil jet flow rate of the oil jet mechanism 530*b*, that is, the opening-degree change timing (Top, Tcl) of the valve mechanism (step S5*b*). The valve opening-degree change timing setting unit 61*b* sets a valve opening timing Top of the valve mechanism and a valve closing timing Tcl of the valve mechanism as the opening-degree change timing of the valve mechanism.

The valve opening timing Top is set as the timing obtained by subtracting the predetermined amount of time Δt from the start timing ts of the knock risk period, as shown in equation (7) below.

$$Top = ts - \Delta t \tag{7}$$

In addition, the valve closing timing Tcl is set as the timing obtained by subtracting the predetermined amount of time Δt from the end timing the of the knock risk period, as shown in equation (8) below.

$$Tcl = te - \Delta t \tag{8}$$

In other words, the valve opening-degree change timing setting unit 61*b* sets the period from when the valve mechanism opens to when the valve mechanism closes as the period that precedes the knock risk period by the predetermined amount of time Δt.

Next, the ECU 2 sends the target degree of valve opening set by the target valve opening-degree setting unit 62*b* in step S4*b* above and the opening-degree change timing (Top, Tcl) of the valve mechanism set by the valve opening-degree change timing setting unit 61*b* in step S5*b* above as valve opening-degree control values to the valve opening-degree change unit 64 (step S6*b*). Thus, the valve opening-degree change unit 64 changes the degree of valve opening of the valve mechanism so that the degree of opening of the valve mechanism becomes the target degree of valve opening during the period from time Top to time Tcl. In addition, before the time Top or after the time Tcl, the valve opening-degree change unit 64 changes the degree of opening of the valve mechanism so that the degree of opening of the valve mechanism becomes zero (or equal to or less than the maximum degree of opening at which the oil jet stops).

In the third embodiment, the valve opening timing Top of the valve mechanism precedes the start timing ts of the knock risk period by the predetermined amount of time Δt. In addition, the oil jet flow rate of the oil jet mechanism 530*b* is increased by opening the valve mechanism of the oil jet unit 53*b*. Therefore, the increase timing of the oil jet flow rate precedes the start timing ts of the knock risk period by the predetermined amount of time Δt. Thus, the amount of cooling of the piston 25 by the oil jet mechanism 530*b* is increased before the piston temperature begins to rise due to the start of knock. Therefore, overheating of the piston 25 in the early stage of the knock risk period can be suppressed. As a result, in the early stage of the knock risk period, the ignition timing can be advanced compared to the above comparative embodiment. Thus, exhaust loss can be reduced.

Furthermore, in the third embodiment, the valve closing timing Tcl of the valve mechanism precedes the end timing te of the knock risk period by the predetermined amount of time Δt. In addition, the oil jet flow rate of the oil jet mechanism **530*b* is decreased by closing the valve mechanism of the oil jet unit 53*b*. Therefore, the decrease timing of the oil jet flow rate precedes the end timing te of the knock risk period by the predetermined amount of time Δt. Thus, it is possible to suppress the overcooling of the piston 25** after the knock risk period. As a result, after the knock risk period, the cooling loss and friction loss can be reduced compared to the above comparative embodiment.

(Cooling Other Than Oil Jet)

Note that in each of the embodiments described above, a control device and control method for the internal combustion engine in which the piston 25 forming the combustion chamber 28 is cooled by an oil jet in order to suppress knock have been described. However, the cooling mechanism for cooling the combustion chamber 28 is not limited to the oil jet mechanism (530, **530*b*) that generates oil jets. For example, the cooling mechanism may be configured by including a cooling water pump that flows cooling water through the water jacket 42. In that case, it is conceivable that the ECU 2 controls the temperature of cooling water to cool the cylinder block 23 and the cylinder head 24**.

The present invention is also applicable to the case where the combustion chamber 28 is cooled by cooling water as described above. For example, by configuring the cooling water pump as an electric water pump and increasing the circulation flow rate of cooling water, which is determined by the discharge flow rate of this electric water pump, the amount of cooling of the combustion chamber 28 by cooling water can be increased, thereby suppressing knocking. Therefore, by controlling the increase or decrease timing of the discharge flow rate of the electric water pump so that the period of an increase in the circulation flow rate of cooling water (period from the start to the end of the increase) precedes the predicted knock risk period by a predetermined amount of time, it is possible to provide an effect similar to that of cooling with an oil jet in the above-described embodiments. In this case, the predetermined amount of time by which the period of the increase in the circulation flow rate of cooling water precedes the knock risk period is preferably the step response time of the cylinder temperature, which is determined by the heat capacity of the cylinder block 23, cooling water system, and the like.

Note that the parameters for increasing or decreasing the amount of cooling of the combustion chamber 28 are not limited to the oil jet flow rate or the circulation flow rate of cooling water, but may include, for example, the fan speed (cooling air flow rate) of a radiator and the amount of oil flowing into an oil cooler.

(Control in the Case of a Missed Prediction)

In the above embodiments, the future knock intensity is predicted on the basis of the predicted results of the future engine output, and further, the knock risk period, which is the period of future knock occurrence, is predicted on the basis of the predicted results of this knock intensity. Then, on the basis of the predicted results, for example, the increase and decrease timings of the amount of cooling of the combustion chamber 28 are set to precede the start timing and end timing, respectively, of the knock risk period by a predetermined amount of time.

Meanwhile, traffic conditions around the automobile 100, unintended manipulation by the driver, or the like may cause a large discrepancy between the predicted results of future engine output and knock occurrence period and the actual engine output and knock occurrence period during the prediction period. In particular, since the knock risk period is predicted on the basis of the knock intensity prediction results, when the prediction results of the knock risk period deviate significantly from the actual knock occurrence period, damage to the internal combustion engine 13, deterioration of drivability (noise and vibration of the internal combustion engine 13), lower fuel economy, and the like may occur due to the occurrence of strong knock.

Therefore, as a preferred embodiment in the case of a missed prediction, the internal combustion engine control device may switch the control method of the internal combustion engine 13 from predictive control to normal control when the engine output predicted by the engine output prediction unit 58 deviates from the actual engine output by more than an allowable value, or when the knock risk period (knock occurrence period) predicted by the knock risk period prediction unit 60 deviates from the actual knock occurrence period by more than the allowable value.

As described in the above embodiments, predictive control is a method for controlling the internal combustion engine 13 to change the amount of cooling of the combustion chamber 28 on the basis of the predicted results of the engine output prediction unit 58, the knock risk period prediction unit 60, and the like. In contrast, normal control is a method for controlling the internal combustion engine 13 to change the amount of cooling of the combustion chamber 28 on the basis of the actual engine output, the actual ignition timing delay amount, or the actual knock intensity detected by a knock sensor or the like. In either control method, the main component that changes the amount of cooling of the combustion chamber 28 is the oil jet flow rate change unit (variable displacement oil pump 57, valve opening-degree change unit 64), which functions as the cooling amount change unit, the cooling water flow rate change unit (electric water pump), which functions as the cooling amount change unit, or the like.

For example, if the difference between the predicted engine output for the current prediction period and the actual engine output for that predicted period becomes equal to or greater than a predetermined value, the ECU 2 stops increasing and decreasing the cooling amount at the increase and decrease timings set on the basis of the predicted engine output, and switches the control method for the internal combustion engine 13 from predictive control to normal control. Thus, in the case of a missed prediction, the internal combustion engine 13 is controlled by normal control rather than predictive control.

If the control method is switched from predictive control to normal control as described above, the ECU 2 controls the internal combustion engine 13 to change the amount of cooling of the combustion chamber 28 (discharge pressure of the variable displacement oil pump 57, degree of opening of the valve mechanism, discharge flow rate of the electric water pump, or the like) on the basis of the actual engine output, actual ignition timing delay amount, or actual knock intensity detected by the knock sensor or the like during the above prediction period.

The control method for the internal combustion engine 13 may be switched in cases other than when the difference between the predicted engine output and the actual engine output becomes equal to or greater than a predetermined value. For example, if, prior to the increase timing of the amount of cooling of the combustion chamber 28 set on the basis of the predicted engine output, the amount of ignition delay exceeds a predetermined value (ignition delay amount), the knock intensity detected by the knock sensor or the like exceeds a predetermined intensity, or at least one of the water temperature, the oil temperature, the wall temperature of the internal combustion engine, and the temperature of intake air exceeds a predetermined temperature, the cooling amount change unit stops increasing the amount of cooling of the combustion chamber 28 at the increase timing of the cooling amount set on the basis of the predicted engine output, and switches the control method for the internal combustion engine 13 from predictive control to normal control. Thus, in the case of a missed prediction, the internal combustion engine 13 is controlled by normal control rather than predictive control.

In addition, for example if, at the decrease timing of the amount of cooling of the combustion chamber 28 set on the basis of the predicted engine output, the amount of ignition delay exceeds a predetermined value, the knock intensity detected by the knock sensor or the like exceeds a predetermined intensity, or at least one of the water temperature, the oil temperature, the wall temperature of the internal combustion engine, and the temperature of intake air exceeds a predetermined temperature, the decrease in the amount of cooling of the combustion chamber 28 at the decrease timing of the cooling amount set on the basis of the predicted engine output is stopped, and the control method of the internal combustion engine 13 is switched from predictive control to normal control. Thus, in the case of a missed prediction, the internal combustion engine 13 is controlled by normal control rather than predictive control.

By switching the control method of the internal combustion engine 13 by the ECU 2 in this manner, it is possible to suppress damage to the internal combustion engine 13 caused by strong knock, deterioration of drivability, and lower fuel economy in a case where the predicted results of engine output or knock risk period deviate significantly from the actual engine output or knock occurrence period, that is, in the case of a missed prediction.

LIST OF REFERENCE SIGNS

1: VCU
2: ECU
13: internal combustion engine
25: piston
28: combustion chamber
53: oil jet unit
57: variable displacement oil pump (oil jet flow rate change unit)
58: engine output prediction unit
59: knock intensity prediction unit
60: knock risk period prediction unit (knock occurrence period prediction unit)
61: hydraulic change timing setting unit (oil jet flow rate change timing setting unit)
**61*b***: valve opening-degree change timing setting unit (oil jet flow rate change timing setting unit)
62: target hydraulic setting unit (target oil-jet flow rate setting unit)
**62*b***: target valve opening-degree setting unit (target oil-jet flow rate setting unit)
63: piston temperature prediction unit
64: valve opening-degree change unit (oil jet flow rate change unit)
100: automobile
101, 102, 103: in-vehicle control device
530: oil jet mechanism (cooling mechanism)

The invention claimed is:

1. An in-vehicle control device mounted in an automobile that is driven by an internal combustion engine having a combustion chamber, the in-vehicle control device comprising:

a cooling mechanism that cools the combustion chamber;

an engine output prediction unit that predicts an engine output that is a future output of the internal combustion engine;

a knock intensity prediction unit that predicts a future knock intensity on a basis of the engine output predicted by the engine output prediction unit;

a knock occurrence period prediction unit that predicts a future knock occurrence period on the basis of the knock intensity predicted by the knock intensity prediction unit;

a target cooling amount setting unit that sets a target amount of cooling delivered by the cooling mechanism on the basis of the knock intensity predicted by the knock intensity prediction unit;

a cooling timing setting unit that sets, as an increase timing of an amount of cooling of the combustion chamber, a timing that precedes a start timing of the knock occurrence period predicted by the knock occurrence period prediction unit by a predetermined amount of time, and sets, as a decrease timing of the amount of cooling of the combustion chamber, a timing that precedes an end timing of the knock occurrence period predicted by the knock occurrence period prediction unit by a predetermined amount of time; and a cooling amount change unit that changes the amount of cooling of the combustion chamber by the cooling mechanism, on the basis of the increase timing and the decrease timing set by the cooling timing setting unit and the target amount of cooling set by the target cooling amount setting unit, wherein in response to a difference between the engine output predicted by the engine output prediction unit and an actual engine output being equal to or greater than a predetermined value, the cooling amount change unit changes the amount of cooling of the combustion chamber on the basis of the actual engine output, an actual amount of ignition delay, or an actual knock intensity.

2. The in-vehicle control device according to claim 1, wherein the cooling mechanism is an oil jet mechanism that cools a piston of the internal combustion engine with an oil jet, the target cooling amount setting unit is a target oil-jet flow rate setting unit that sets a target oil-jet flow rate of the oil jet mechanism on the basis of the knock intensity predicted by the knock intensity prediction unit, the cooling timing setting unit is an oil jet flow rate change timing setting unit that sets, as an increase timing of an oil jet flow rate of the oil jet mechanism, a timing that precedes the start timing of the knock occurrence period predicted by the knock occurrence period prediction unit by a predetermined amount of time, and sets, as a decrease timing of the oil jet flow rate of the oil jet mechanism, a timing that precedes the end timing of the knock occurrence period predicted by the knock occurrence period prediction unit by a predetermined amount of time, and the cooling amount change unit is an oil jet flow rate change unit that changes the oil jet flow rate of the oil jet mechanism on the basis of the increase timing and decrease timing set by the oil jet flow rate change timing setting unit and the target oil-jet flow rate set by the target oil-jet flow rate setting unit.

3. The in-vehicle control device according to claim 2, wherein the target oil-jet flow rate setting unit is a target hydraulic setting unit that sets a target hydraulic pressure of the oil jet mechanism on the basis of the knock intensity predicted by the knock intensity prediction unit, the oil jet flow rate change timing setting unit is a hydraulic change timing setting unit that sets, as a rise timing of a hydraulic pressure of the oil jet mechanism, a timing that precedes the start timing of the knock occurrence period predicted by the knock occurrence period prediction unit by a predetermined amount of time, and sets, as a decrease timing of the hydraulic pressure of the oil jet mechanism, a timing that precedes the end timing of the knock occurrence period predicted by the knock occurrence period prediction unit by a predetermined amount of time, and the oil jet flow rate change unit is a variable displacement oil pump that changes a pressure of oil delivered to the oil jet mechanism, on the basis of the rise timing and decrease timing set by the hydraulic change timing setting unit and the target hydraulic pressure set by the target hydraulic setting unit.

4. The in-vehicle control device according to claim 2, wherein the oil jet mechanism includes an oil jet unit with a built-in valve mechanism, the target oil-jet flow rate setting unit is a target valve opening-degree setting unit that sets a target degree of valve opening of the valve mechanism on the basis of the knock intensity predicted by the knock intensity prediction unit, the oil jet flow rate change timing setting unit is a valve opening-degree change timing setting unit that sets, as a valve opening timing of the valve mechanism, a timing that precedes the start timing of the knock occurrence period predicted by the knock occurrence period prediction unit by a predetermined amount of time, and sets, as a valve closing timing of the valve mechanism, a timing that precedes the end timing of the knock occurrence period predicted by the knock occurrence period prediction unit by a predetermined amount of time, and the oil jet flow rate change unit is a valve opening-degree change unit that changes a degree of opening of the valve mechanism on the basis of the valve opening timing and valve closing timing set by the valve opening-degree change timing setting unit and the target degree of valve opening set by the target valve opening-degree setting unit.

5. The in-vehicle control device according to claim 2, further comprising a piston temperature prediction unit that predicts a piston temperature prior to the start timing of the knock occurrence period predicted by the knock occurrence period prediction unit, wherein when the piston temperature predicted by the piston temperature prediction unit is lower than a predetermined temperature, the oil jet flow rate change timing setting unit delays the increase timing of the oil jet flow rate compared to when the piston temperature predicted by the piston temperature prediction unit is higher than the predetermined temperature.

6. The in-vehicle control device according to claim 2, wherein the predetermined amount of time is determined by a step response time of a piston temperature of the internal combustion engine.

7. The in-vehicle control device according to claim 6, wherein the step response time of the piston temperature falls within a range from time t1 (ms) to time t2 (ms) defined by equations (1), (2) and (3) below, where V ($mm^3$) is a volume of the piston of the internal combustion engine, B (mm) is a diameter of the piston, d (mm) is a thickness of the piston, and π is a circular constant $$t1 = 4.9d^2 \quad (1)$$

$$t2 = 30d^2 \quad (2)$$

$$d = 4V/\pi B^2. \quad (3)$$

8. The in-vehicle control device according to claim 1, wherein the engine output prediction unit predicts engine torque and engine speed as the engine output, and the knock intensity prediction unit predicts a future knock intensity on the basis of the engine torque and engine speed predicted by the engine output prediction unit.

9. The in-vehicle control device according to claim 8, wherein the knock intensity predicted by the knock intensity prediction unit is corrected on the basis of at least one of intake air temperature, intake air humidity, water temperature, oil temperature, intake pressure, internal combustion engine wall temperature, fuel octane rating, air-fuel ratio, and EGR rate.

10. The in-vehicle control device according to claim 1, wherein the knock occurrence period prediction unit predicts, as the knock occurrence period, a period during which the knock intensity predicted by the knock intensity prediction unit is equal to or greater than a predetermined knock threshold value.

11. An in-vehicle control device mounted in an automobile that is driven by an internal combustion engine having a combustion chamber, the in-vehicle control device comprising:

a cooling mechanism that cools the combustion chamber;

an engine output prediction unit that predicts an engine output that is a future output of the internal combustion engine;

a knock intensity prediction unit that predicts a future knock intensity on a basis of the engine output predicted by the engine output prediction unit;

a knock occurrence period prediction unit that predicts a future knock occurrence period on the basis of the knock intensity predicted by the knock intensity prediction unit;

a target cooling amount setting unit that sets a target amount of cooling delivered by the cooling mechanism on the basis of the knock intensity predicted by the knock intensity prediction unit;

a cooling timing setting unit that sets, as an increase timing of an amount of cooling of the combustion chamber, a timing that precedes a start timing of the knock occurrence period predicted by the knock occurrence period prediction unit by a predetermined amount of time, and sets, as a decrease timing of the amount of cooling of the combustion chamber, a timing that precedes an end timing of the knock occurrence period predicted by the knock occurrence period prediction unit by a predetermined amount of time; and a cooling amount change unit that changes the amount of cooling of the combustion chamber by the cooling mechanism, on the basis of the increase timing and the decrease timing set by the cooling timing setting unit and the target amount of cooling set by the target cooling amount setting unit, wherein in response to an amount of ignition delay exceeds a predetermined amount of ignition delay prior to the increase timing of the amount of cooling set by the cooling timing setting unit, the knock intensity exceeds a predetermined intensity, or at least one of water temperature, oil temperature, internal combustion engine wall temperature, and intake air temperature exceeds a predetermined temperature, the cooling amount change unit changes the amount of cooling of the combustion chamber on the basis of an actual engine output, an actual amount of ignition timing delay, or an actual knock intensity.

12. An in-vehicle control device mounted in an automobile that is driven by an internal combustion engine having a combustion chamber, the in-vehicle control device comprising:

a cooling mechanism that cools the combustion chamber;

an engine output prediction unit that predicts an engine output that is a future output of the internal combustion engine;

a knock intensity prediction unit that predicts a future knock intensity on a basis of the engine output predicted by the engine output prediction unit;

a knock occurrence period prediction unit that predicts a future knock occurrence period on the basis of the knock intensity predicted by the knock intensity prediction unit;

a target cooling amount setting unit that sets a target amount of cooling delivered by the cooling mechanism on the basis of the knock intensity predicted by the knock intensity prediction unit;

a cooling timing setting unit that sets, as an increase timing of an amount of cooling of the combustion chamber, a timing that precedes a start timing of the knock occurrence period predicted by the knock occurrence period prediction unit by a predetermined amount of time, and sets, as a decrease timing of the amount of cooling of the combustion chamber, a timing that precedes an end timing of the knock occurrence period predicted by the knock occurrence period prediction unit by a predetermined amount of time; and a cooling amount change unit that changes the amount of cooling of the combustion chamber by the cooling mechanism, on the basis of the increase timing and the decrease timing set by the cooling timing setting unit and the target amount of cooling set by the target cooling amount setting unit, wherein in response to determining that at the decrease timing of the amount of cooling set by the cooling timing setting unit, an amount of ignition delay exceeds a predetermined amount of ignition delay, the knock intensity exceeds a predetermined intensity, or at least one of water temperature, oil temperature, internal combustion engine wall temperature, and intake air temperature exceeds a predetermined temperature, the cooling amount change unit changes the amount of cooling of the combustion chamber on the basis of an actual engine output, an actual amount of ignition timing delay, or an actual knock intensity.

13. A method for controlling an internal combustion engine in an automobile, the automobile including the internal combustion engine having a combustion chamber, and a cooling mechanism for cooling the combustion chamber, the method comprising:

an engine output prediction step for predicting an engine output that is a future output of the internal combustion engine;

a knock intensity prediction step for predicting a future knock intensity on a basis of the engine output predicted in the engine output prediction step;

a knock occurrence period prediction step for predicting a future knock occurrence period on the basis of the knock intensity predicted in the knock intensity prediction step;

a target cooling amount setting step for setting a target amount of cooling delivered by the cooling mechanism on the basis of the knock intensity predicted in the knock intensity prediction step;

a cooling timing setting step for setting, as an increase timing of an amount of cooling of the combustion chamber, a timing that precedes a start timing of the knock occurrence period predicted in the knock occurrence period prediction step by a predetermined amount of time, and sets, as a decrease timing of the amount of cooling of the combustion chamber, a timing that precedes an end timing of the knock occurrence period predicted in the knock occurrence period prediction step by a predetermined amount of time; and a cooling amount change step for changing the amount of cooling of the combustion chamber by the cooling mechanism, on the basis of the increase timing and decrease timing set in the cooling timing setting step and the target amount of cooling set in the target cooling amount setting step; and in response to determining a difference between the engine output predicted by the engine output prediction unit and an actual engine output being equal to or greater than a predetermined value, changing the amount of cooling of the combustion chamber on the basis of the actual engine output, an actual amount of ignition delay, or an actual knock intensity.

* * * * *